(12) United States Patent
Russ et al.

(10) Patent No.: US 11,797,588 B2
(45) Date of Patent: Oct. 24, 2023

(54) MAINTAINING ANONYMITY OF SURVEY RESPONDENTS WHILE PROVIDING USEFUL SURVEY DATA

(71) Applicant: Qualtrics, LLC, Provo, UT (US)

(72) Inventors: John Russ, Provo, UT (US); Christian De Sousa, Seattle, WA (US); Alexia Newgord, Seattle, WA (US); Katherine Lee, Seattle, WA (US); Cameron Hunter, Issaquah, WA (US)

(73) Assignee: Qualtrics, LLC, Provo, UT (US)

( * ) Notice: Subject to any disclaimer, the term of this patent is extended or adjusted under 35 U.S.C. 154(b) by 104 days.

(21) Appl. No.: 16/776,450

(22) Filed: Jan. 29, 2020

(65) Prior Publication Data

US 2020/0242138 A1 Jul. 30, 2020

Related U.S. Application Data

(60) Provisional application No. 62/798,270, filed on Jan. 29, 2019.

(51) Int. Cl.
*G06F 16/335* (2019.01)
*G06F 16/2455* (2019.01)
*G06F 16/242* (2019.01)
*G06Q 30/0203* (2023.01)
*G06F 21/62* (2013.01)

(52) U.S. Cl.
CPC ........ *G06F 16/335* (2019.01); *G06F 16/2428* (2019.01); *G06F 16/2455* (2019.01); *G06F 21/6254* (2013.01); *G06Q 30/0203* (2013.01)

(58) Field of Classification Search
CPC .............. G06F 16/335; G06F 16/2428; G06F 16/2455; G06F 21/6254; G06Q 30/0203
See application file for complete search history.

(56) References Cited

U.S. PATENT DOCUMENTS

| | | | |
|---|---|---|---|
| 2009/0299819 A1* | 12/2009 | Davis, III | G06Q 30/0282 705/7.38 |
| 2019/0166102 A1* | 5/2019 | Chizi | G06Q 30/0641 |
| 2019/0205507 A1* | 7/2019 | Antonatos | H04L 63/1416 |
| 2019/0377832 A1* | 12/2019 | McLean | H04L 63/20 |
| 2020/0082120 A1* | 3/2020 | Richardson | G06F 21/6254 |

OTHER PUBLICATIONS

Anonymous et al. ("Maintaining Survey Anonymity", Publication Date: Aug. 25, 2011; Publish in the IP.com Prior Art Database) (Year: 2011).*

* cited by examiner

*Primary Examiner* — Ken Hoang
(74) *Attorney, Agent, or Firm* — Keller Preece PLLC

(57) ABSTRACT

The present disclosure relates to systems, non-transitory computer-readable media, and methods for maintaining the anonymity of survey respondents while providing useful data to an analyst. In particular, in one or more embodiments, the disclosed systems utilize various anonymity protections based on various anonymity thresholds. For example, the presently disclosed systems and methods may disallow or modify potentially identifying data filters, including generating alternate data groupings. Further, the systems and methods may modify text responses to reduce identification risk.

20 Claims, 15 Drawing Sheets

MAINTAINING ANONYMITY OF SURVEY RESPONDENTS WHILE PROVIDING USEFUL SURVEY DATA

CROSS-REFERENCE TO RELATED APPLICATIONS

The present application claims priority to U.S. Provisional Application No. 62/798,270, filed on Jan. 29, 2019. The aforementioned application is hereby incorporated by reference in its entirety.

BACKGROUND

Recent years have seen significant increases in collecting feedback from respondents (e.g., customers, employees, etc.) using digital survey systems. For example, various entities in various industries (e.g., business, government, education) use digital survey systems to collect responses from many sources, analyze the responses, and provide responses and reports to allow survey administrators to analyze and draw conclusions from the survey response data. In addition, there are many applications of digital surveys where it is important to maintain the anonymity of the respondents that provide the response data. However, many conventional survey systems provide no anonymity protection and explicitly associate a respondent's identity with a response. Moreover, while some conventional systems do not explicitly associate identification data of a respondent with a response, that alone often is insufficient to maintain the anonymity of a respondent. For example, many response analysis features can compromise anonymity by breaking down the data into small groups that makes a respondent identifiable based on the data group itself. Thus, conventional systems fail to provide analytical tools and features to allow administrators to study response data and systems to adequately protect the anonymity of responses during the analysis.

To illustrate, many conventional systems provide survey systems that display survey responses with identifying information, such as a respondent's name or IP address. These types of conventional survey systems are unable to protect the anonymity of responses in any way. Other conventional systems attempt to protect anonymity by merely displaying responses without the names of survey respondents. However, conventional systems that use this approach fail to adapt to the particular needs of a specific dataset. For example, based on characteristics of a dataset, a user may accidentally or intentionally be able to identify a respondent's identity. Accordingly, conventional systems lack the flexibility and precision to adjust to characteristics of a specific dataset to adequately protect response anonymity.

Further, some conventional systems allow manipulation of data through data filtering in a manner that allows users to intentionally or accidentally compromise the anonymity of survey results. For example, conventional systems may filter survey responses down to small groups or a group of one, thus allowing a user to identify a respondent based on the data filtering, even if the user did not intend to do so. For example, conventional systems may allow a user to filter based on gender, age, or other data characteristics, thereby creating a small enough group to identify one or more responses provided by one or more respondents. Moreover, conventional systems fail to protect the anonymity of survey respondents in the filtered-out data, or in other words, in the survey responses not directly displayed based on a data filter.

For example, a broad data filter may result in filtering out only a select few survey responses and thus provide a large data set that seemingly protects the anonymity of the users associated with the large data set. However, based on the filter, a user can infer the identity of those users associated with the select few survey responses that were filtered out, thus compromising the anonymity for those users. Accordingly, conventional systems fail to protect the anonymity of users associated on both sides of a data filter, e.g., the data being presented as well as the data being filtered out. Accordingly, conventional systems allow manipulation of survey data without regard to maintaining anonymity, which can result in an anonymity breach.

Additionally, many survey responses may include text responses to survey questions. Conventional systems often provide these text responses verbatim to a user reviewing the text responses, even when text within the survey responses may contain identifying language, such as names, pronouns, or locations. In many survey contexts, a user may be familiar with the writing styles or habits of survey respondents, thus providing verbatim text compromises the anonymity of responses. Accordingly, conventional systems fail to account for potentially identifying information within text that respondents to a survey provide.

These along with additional problems and issues exist with regard to conventional survey systems.

BRIEF SUMMARY

Embodiments of the present disclosure provide benefits and/or solve one or more of the foregoing or other problems in the art with systems, non-transitory computer-readable media, and methods for maintaining the anonymity of survey respondents while providing useful data to an analyst. For example, the systems and methods provide increased user control over anonymity thresholds and are able to determine anonymity thresholds based on the sensitivity of a data field, the number of responses that result from a data request (e.g., applying a data filter), or predefined settings. Moreover, the systems and methods enhance data anonymity by protecting anonymity for both sides of a data filter request, meaning, the systems and methods simultaneously ensure that data is not filtered in a way that would result in an identifiable group of data that is either part of a presented data set or is filtered-out of a presented data set on a data filter request. Furthermore, the systems and methods can dynamically update data filtering options and remove filter options from potential selections based on determining that a selection of such an option would compromise the anonymity of the resulting data.

In addition, the anonymity protection system may genericize survey responses in various ways, such as correcting errors, replacing distinct words with generic ones, removing identifying language, and restructuring comments into generic portions. Additionally, in response to a data request, the system may modify a data report to include additional data, withhold data, or reject the data request in order to maintain anonymity of respondents associated with the data request. The systems and methods may implement these anonymity protections in a variety of data reporting contexts and may apply various levels of anonymity protection based on individual analyst permissions.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
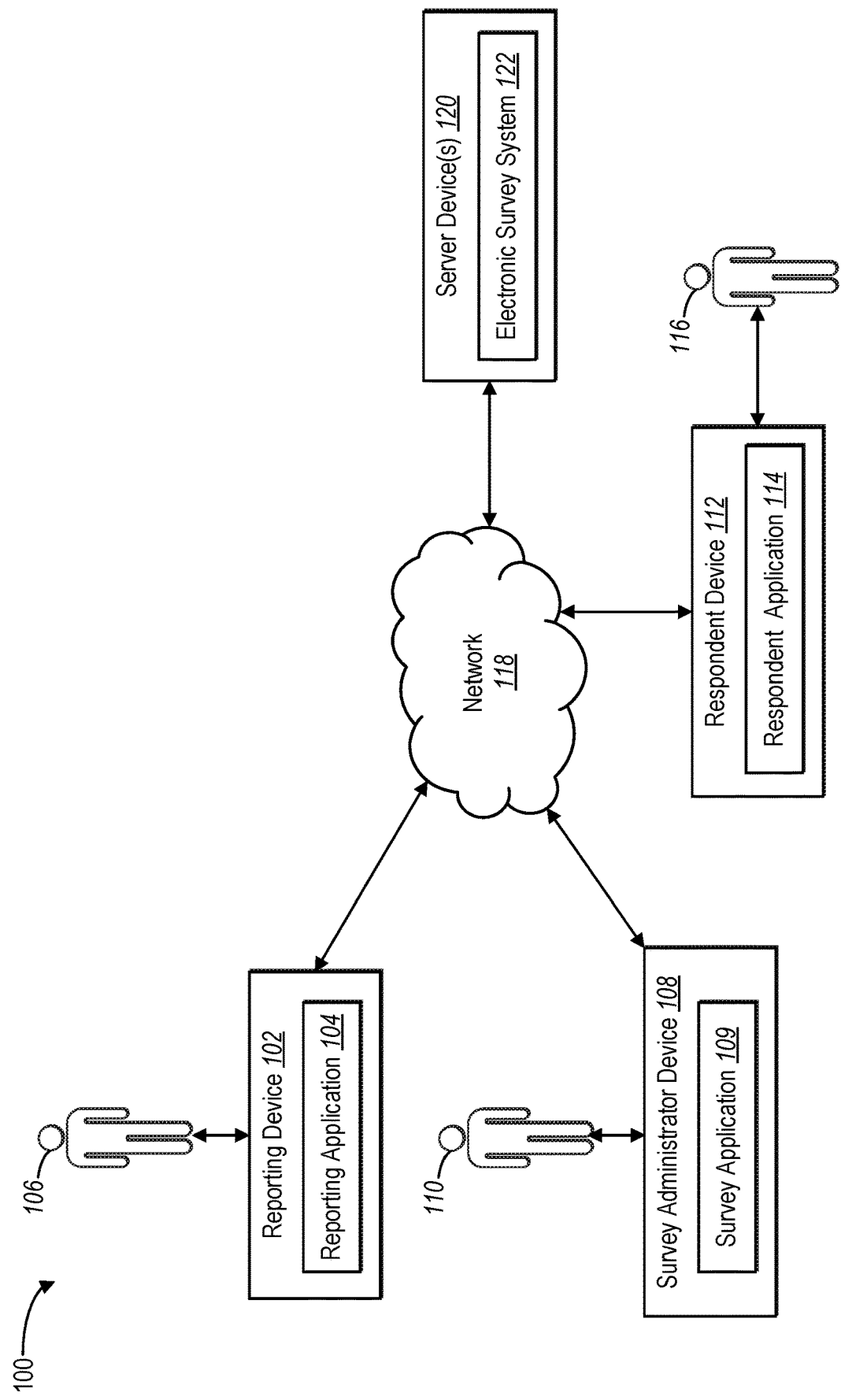
FIG. 1 illustrates a diagram of an environment in which an anonymity protection system can operate in accordance with one or more embodiments.

One or more embodiments disclosed herein provide an anonymity protection system for maintaining the anonymity of respondents while providing interactive data analysis interface. Various embodiments of the anonymity protection system determine anonymity thresholds to apply to data requests received from client devices associated with data analysts. In some embodiments, the anonymity protection system rejects data requests (e.g., a data filtering request) that would result in a data breakout that would not meet an anonymity threshold, which in turn could compromise the anonymity of survey respondents. In other embodiments, and based on an anonymity threshold, the anonymity protection system generates data output that maintains the anonymity of respondents. For example, in response to a data request, the anonymity protection system can modify the actual requested data to provide a modified data output to maintain the anonymity of respondents. Furthermore, in some embodiments, the anonymity protection system can dynamically update data request options (e.g., data filter options) to remove data request options that would result in a potential breach of anonymity of a user associated with the data. Accordingly, the anonymity protection system actively protects the anonymity of respondents while seamlessly providing a data analyst interface that provides data research and review functionality.

As mentioned above, the anonymity protection system determines and/or applies anonymity thresholds to a dataset to protect the anonymity of respondents associated with response data. In one or more embodiments, the system can associate an anonymity threshold with each data field of a dataset. For example, an anonymity threshold dictates the granularity of data reporting that the anonymity protection system provides without the granularity of data being so fine that respondent anonymity is compromised. In one or more embodiments, for example, the anonymity protection system associates a gender data field with a strict anonymity threshold to prevent an analyst from identifying respondents based on gender, while the system associates more generic data fields with more lenient anonymity thresholds. Accordingly, by applying the anonymity thresholds associated with the data fields of a dataset, the anonymity protection system can actively respond to data requests from an analyst client device while maintaining respondent anonymity.

Example embodiments of the anonymity protection system enable a user increased control over anonymity settings. For example, the anonymity protection system can receive user-defined anonymity settings based on a particular organization's needs, industry standards, or other considerations. In addition, the anonymity protection system provides a graphical user interface to allow a user to enter "grades" or "scores" representing the importance of anonymity for each data field present in a dataset, and the anonymity protection system may determine anonymity thresholds based on the "grades" or "scores." In other embodiments, the anonymity protection system can generate anonymity thresholds based on the type of data in a data field, the amount of data in the data set, and/or other characteristics of data fields and data sets as described in additional detail below.

As used herein, the term "anonymity threshold" refers to a system-required number of respondents related to a data request in order for the system to present data related to that request. In particular, the term "anonymity threshold" can include a minimum number of respondents within filtered-in data, filtered-out data, and possible cross-filters of data necessary for the anonymity protection system to provide anonymous data in response to a data request. In other words, an "anonymity threshold" can include a minimum number of respondents associated with a data breakout that would ensure the anonymity of the respondents. For example, an anonymity threshold can include a minimum number of respondents to include in a data breakout to ensure that the identity of an individual respondent cannot be directly viewed in a data breakout (e.g., within filtered-in data provided in response to a data request) and cannot be indirectly inferred from data not included in a data breakout (e.g., within filtered-out data that can be identified based on a cross-filter between unfiltered data and filtered-in data).

The immediately below examples explain various processes and functions of the anonymity protection system with respect to a filter data request. However, the anonymity protection system protects the anonymity of respondents associated with any data included in any data breakout. As used herein, the term "data breakout" refers to any subset of a dataset based on one or more data characteristics. For example, a dataset can include all survey responses for corresponding to an electronic survey, and a data breakout can include a subset of survey responses based on any number of parameters, such as survey administration time or date, location, gender, age, other demographic characteristics, employee position, compensation, and/or any other characteristic or attribute associated with a survey response. Examples of a data breakout can include one or more data filters, data widgets designed to show a particular subset of data, tables, charts, graphs, and other visualizations or reports that include data subsets from a dataset. Accordingly, while the below discusses various functions and principles with respect to data filters, the below principles can be applied to any data breakout.

With specific reference to data filters, the anonymity protection system actively applies anonymity thresholds to protect respondent anonymity when responding to a data filter request for both filtered-in data as well as filtered-out data. As used herein, filtered-in data refers to the data that meets filter criteria defined in a filter request. In other words, filtered-in data refers to the resulting filtered dataset the anonymity protection system provides for display to a user in response to a data filter request. Conversely, filtered-out data refers to data that does not meet filter criteria defined in a data filter request. For example, filtered-out data refers to data the anonymity protection system removes from an overall dataset to create the filtered dataset, and thus the anonymity protection system does not provide the filtered-out data for display in response to a filter request.

For example, based on applying one or more anonymity thresholds to a data request to filter data, the anonymity protection system can provide filtered-in results that protect the anonymity of respondents associated with the filtered-in data as well as the filtered-out data. For example, in response to a data request that includes a granular filter (e.g., the data request filters out most of the data in a dataset), the anonymity protection system can apply one or more anonymity thresholds to ensure that the data request response does not provide a data group for display that would allow a user to identify respondents associated with the filtered-in data. In some embodiments, the anonymity protection system determines the number of responses in the filtered-in data and compares that number to the anonymity thresholds associated with each of the data fields to be included in the data request. If the number of responses in the filtered-in data is below the anonymity threshold(s), then the anonymity protection system can modify the response to the data request to ensure that data is not provided in a way that would compromise respondent anonymity.

In addition to applying anonymity thresholds to filtered-in data, the anonymity protection system can also apply anonymity thresholds to filtered-out data. For instance, with conventional systems, a user may submit a data request to filter data that includes a coarse filter (e.g., the data request filters only a small portion of the total dataset). In such a case, a user can infer from the small group of filtered-out data the identity of respondents associated with the filtered-out data based on the lack of the filtered-out data displayed in response to the course filter request. This problem of breaching anonymity in conventional systems based on filtered-out data is further compounded in situations where a user can input a first data request with a first filter and a second data request with a second filter and then compare the filtered-in data from both the first data request and the filtered-in data from the second data request to isolate a small group of data in the cross-section of the first filter and the second filter. Once the small group of data is isolated, the requesting user can infer identifying information associated with the response data. In other words, in conventional systems, a small group of data can be isolated based on two or more data filter requests, and thus conventional systems inadvertently allow a breach of anonymity.

To solve the issue of breaching anonymity based on filtered-out data, the anonymity protection system disclosed herein applies anonymity thresholds to any grouping of data, whether a grouping is part of the filtered-in data or the filtered-out data. For example, the anonymity protection system enforces anonymity thresholds for both the filtered-in data group as well as the filtered-out data group to ensure that any data groupings is not so small as to compromise the anonymity of the respondents associated with the data. In addition, the anonymity protection system applies anonymity thresholds such that comparing filtered-in and/or filtered-out data from two or more data filter requests would not result in an inferred data grouping that would compromise the anonymity of respondents. Accordingly, the anonymity protection system uses the anonymity thresholds to not only protect the anonymity of data within a single data request, but in addition, the anonymity protection system uses the anonymity thresholds to respond to multiple data requests in a way that even when the responses to multiple data requests are combined, the anonymity of the respondents associated with the data remains protected.

The anonymity protection system can perform a variety of actions to protect the anonymity of data based on enforcing anonymity thresholds associated with a dataset. In one or more embodiments, the anonymity protection system applies one or more anonymity thresholds to a data request by disallowing data reporting that does not comply with anonymity thresholds. For example, an anonymity threshold could require that a data request that includes the data field for gender must result in data groupings that have at least ten responses. To illustrate, based upon receiving a data request from a client device of an analyst that requests, at least in part, to filter survey responses based on gender (e.g., show only male response data), the anonymity protection system determines the number of responses in the filtered-in data output as well as the filtered-out data and compares both the filtered-in data output and the filtered-out data with the anonymity threshold associated with the gender data set. If the number of responses in either data grouping is under the anonymity threshold (e.g., under ten responses), then the anonymity protection system can disallow the data request.

In some embodiments, based on determining to disallow a data request per anonymity thresholds, the anonymity protection system denies the data request. In such embodiments, the anonymity protection system can provide, in response to the data request, an anonymity warning with instructions or suggestions to revise the data request in a way that would meet the anonymity thresholds. For example, in the event that the anonymity protection system receives a data request that requests data filtered by gender, location, and response answer, the anonymity protection system can determine that removing the location filter would result in the gender anonymity threshold being satisfied. Accordingly, the anonymity protection system generates a data request suggestion that provides an option for the analyst to remove the location filter with an explanation that doing so would result in a data request that meets the anonymity thresholds associated with the data set.

To illustrate, and referring to the above example, a gender data field in a dataset can be associated with an anonymity threshold that requires that at least ten responses be included in either the filtered-in data or the filtered-out data in response to any data request that includes the gender data field. In response to receiving a data request that requests to filter the data to show male respondents between the ages of 20 and 22, the anonymity protection system may identify that the filtered-out data results in a data grouping that includes five responses. Based on determining that the five responses in the filtered-out data do not meet the anonymity threshold of ten associated with the gender data field, the anonymity protection system modifies the actual data output by adding additional data to meet the anonymity threshold. For example, the anonymity protection system can modify the age range of the filter request to add responses to the filtered-out data grouping that would result in the filtered-out data grouping including at least ten respondents, and thus complies with the anonymity threshold. Additional examples and details are provided below.

As illustrated in the above example, the anonymity system continuously monitors and processes data requests against anonymity thresholds to ensure that no particular data grouping or data breakout violates an anonymity threshold or is capable of violating an anonymity threshold when combined with another potential data request (e.g., aa cross-section of two or more data requests). Moreover, the anonymity system can dynamically group data together in response to a data request to enforce an anonymity threshold. For example, dynamically grouping data can include combining data to either a filtered-in grouping of data and/or a filtered-out grouping of data to force the both the filtered-in and filtered-out groupings of data to each include a minimum number of responses to satisfy the anonymity threshold.

In one or more embodiments, the anonymity protection system can use the anonymity thresholds to dynamically determine and provide only data request options that satisfy anonymity thresholds corresponding to a dataset. For example, based on the anonymity thresholds corresponding to a dataset, the anonymity protection system can activate and/or deactivate various data request options so that the options the system provides satisfy the anonymity thresholds. For instance, the system deactivates data request options by providing a graphical user interface that suppresses options that would violate anonymity thresholds (e.g., so a user does not even have an option to create a data request that violates an anonymity threshold). Deactivating data request options can include not providing an option within a data request graphical user interface or "graying out" options so that the options are not selectable options that a user can add to a data request.

For example, based on the size of a first dataset and the anonymity thresholds associated with the dataset, the anonymity protection system can activate the ability for a user to filter based on age and location in response to determining that any resulting filter combination based on age and location will include a minimum number of responses in both the filtered-in data and filtered-out data that effectively protects the anonymity of the respondents associated with the data. On the other hand, a second dataset may include a smaller number of responses compared to the first dataset. Accordingly, based on the smaller size of the second dataset and the anonymity thresholds of the second dataset, the anonymity protection system can deactivate or not provide options that allow a user to filter based on age and location in response to determining that there is at least one scenario that would result in isolating a small grouping of data (whether filtered-in data or filtered-out data) that is below the anonymity threshold.

In some embodiments, the anonymity protection system can activate and/or deactivate data request options based on an initial analysis of a dataset as a whole. For example, the anonymity protection system analyzes the dataset with respect to the anonymity thresholds and determines a set of data request options to activate with respect to the dataset. In other embodiments, the anonymity protection system can activate and/or deactivate data request options in response to receiving data requests. For example, initially the anonymity protection system can activate filters for age and location because neither one of those filters alone would breach an anonymity threshold. However, once a user inputs a data request for age, the anonymity protection system can determine to deactivate the data filter for location because the combination of the age data filter and the location data filter would breach the anonymity thresholds.

Furthermore, the anonymity protection system can modify one or more previously applied filters based on a selection of an additional filter. For example, the system can receive a first data request that includes a first filter (e.g., filter by a location). The system can determine that providing a data breakout based on the first filter meets the anonymity threshold and accordingly provides the breakout. The system can then receive a second data request that includes a second filter (e.g., filter by age) which would be applied in combination with the first filter. At this point, the system can determine that providing a data breakout that applies both the first and second filter would not meet the anonymity threshold. In response to determining that the first and second filter result in a non-compliant data breakout, the anonymity protection system can modify the application of the first filter. For example, the anonymity protection system can simply remove the first filter and only apply the second filter and provide a visual indication that the first filter was removed as an anonymity control. Alternatively, the anonymity protection system could modify the application of the first filter so that the resulting data breakout meets the anonymity threshold. For instance, if the first filter was based on Location A, the system could modify this filter upon receiving the second filter by filtering the data by Location A and Location B based on determining that such a grouping in combination with the second filter meets the anonymity threshold. In such as case, the system would provide a visual indication of the modification of the first filter with an explanation of how it was modified for purposes of anonymity control.

In addition to the activating or deactivating data request options, the anonymity protection system can create data request options by grouping options together before the user ever selects an option. For example, the anonymity protection system can create a set of data filter options or other data breakout options that ensure the anonymity of respondents even when combing all of the possible combinations of available data request options. The anonymity protection system generates the data request options based on evaluating the size of the dataset, the number of categories within the dataset, and the anonymity thresholds associated with each of the categories and identifies any data request options or combination of data request options that would result in a breach of an anonymity threshold for both filtered-in data and filtered-out data. Based on the evaluation, the anonymity protection system generates data request options that satisfy the anonymity thresholds associated with the dataset (additional examples discussed below with respect to FIGS. 7A and 7B). Accordingly, based on the above principles, the system creates a more efficient graphical user interface by automatically determining data request options that satisfy anonymity thresholds and providing a graphical user interface that include only those data request options that satisfy the anonymity thresholds. Thus, the system avoids a user sending in data requests that are not allowed by anonymity thresholds associated with a dataset, which further increases the efficiency of the system by reducing the number of data requests.

In one or more embodiments, the anonymity protection system can use one or more of the above principles with respect to an organization hierarchy to maintain the anonymity of employees (e.g., employees that participate in an organization survey such as an employee satisfaction survey). Organizational hierarchies present a unique problem to survey data anonymity because many organizations are built with teams or departments made of up smaller groups of people (e.g., 2-8). Often managers want to view and analyze response data based on team or department, however, because of the small teams, providing data based on team often results in a breach of anonymity for the individual team members within conventional systems as managers can use cross-filters to infer the identity of employees associated with particular survey responses.

To solve the issues associated with protecting respondent anonymity within organization hierarchies, examples of the anonymity protection system can analyze response data and group two or more teams together to create data groupings that satisfy the anonymity thresholds while still providing relevant information to managers. The anonymity protection system, for example, can determine that a child unit (e.g., a team) is below an anonymity threshold and combine it with one or more of the next smallest child unit(s) until the group collectively exceeds the anonymity threshold. This grouping can take place prior to any selected data request, or alternatively, the grouping can take place in response to a data request that includes one or more filters or other data breakouts.

Furthermore, in one or more embodiments, instead of the anonymity protection system grouping two child units together, the anonymity protection system can exclude data of a child based on the number of respondents within the child unit being below the anonymity threshold, but then include data from the child unit at higher levels within the hierarchy by rolling up the child unit data with other child units or other units at other levels. In this way, the anonymity protection system can protect small groups from being isolated and exposing their identities at team level and at the same time allows the response data from the respondents of the particular team to be included and considered at higher level data roll-ups. Additional details with respect to protecting anonymity of respondents within an organization hierarchy reporting scheme will be discussed in further detail below with respect to FIGS. 5C-5D.

Additionally, the anonymity protection system can provide visual indicators that indicate when data was grouped or modified in order to protect anonymity. In one or more embodiments, for example, the system generates and provides a tooltip along with a data breakout when data was modified, excluded, and/or grouped to provided anonymity protection. Upon receiving an indication of a user interacting with the tool tip (e.g., a user hoovering a mouse cursor over the tooltip), the system can provide additional information about any applied anonymity control to the data breakout. In some examples the system simply provides a message or notification that an anonymity control measure was applied to the data breakout. In other examples the system provides additional information about the specific anonymity control measure the system applied. For example, the system can indicate a number of responses that were excluded from the breakout or an explanation of a grouping of data. Accordingly, the system can provide visual indications to users that anonymity protection is active within the data breakouts as well as explanations of the specific measures taken so that users are not confused by the data breakouts the system provides.

In addition to modifying data output to enforce anonymity thresholds, example embodiments of the anonymity protection system may also genericize text responses in order to maintain anonymity of respondents. For example, particular spelling or grammar errors may be identifying of an individual responding in a non-native language, or a particular error might be identifiable by an analyst familiar with the respondents' writing. Accordingly, the anonymity protection system may correct errors in text responses to protect anonymity. Uncommon words may also be identifying, either of a region or of a particular respondent. Thus, the anonymity protection system may also protect respondent anonymity by replacing distinct words with generic ones. Additionally, identifying language such as pronouns, locations, or names could compromise anonymity of survey data. The anonymity protection system may identify and redact, remove or replace identifying language to protect the anonymity of respondents.

In addition to removing identifying text, the anonymity protection system can recognize stylistic characteristics within the text that may compromise the anonymity of a respondent. For example, to remove stylistic characteristics from a text response, the anonymity protection system may break apart and/or reconstruct survey text responses. The reconstruction can identify and separate out portions of a single text response and generate multiple text responses that each include a portion of the single text response so as to conceal the fact that each portion came from the same respondent. Accordingly, and as will be described in further detail below, the anonymity protection system may implement a variety of methods to protect anonymity against identification risks posed by text responses.

Notwithstanding the various processes and functions the anonymity protection system uses to protect respondent anonymity, in some embodiments the anonymity protection system can define various anonymity access levels that controls the anonymity thresholds applied for the specific analyst. For example, a survey administrator may be part of an organization where many individual users have access to survey data. The sensitivity of survey data may vary for various users. For example, based on user input or system-determined groups, the anonymity protection system may assign one group of users a minimum anonymity threshold of ten, a second group of users a minimum anonymity threshold of five, and a third group of users a minimum anonymity threshold of three. In addition, the system may also determine a level of genericization for text responses based on an analyst's anonymity access level.

Example embodiments of the anonymity protection system implement these anonymity protections in a variety of data reporting contexts across many graphical user interfaces. For example, the anonymity protection system may provide a graphical user interface for the survey administrator to input anonymity settings, anonymity access levels, and other survey settings. The system may also provide, within this graphical user interface, an option for the survey administrator to grade or rank anonymity protections for various data fields of a dataset. The system may also provide a data reporting interface for survey data, which may implement anonymity threshold and anonymity access levels.

Based on the general principles discussed above, as well as the details discussed below, the anonymity protection system improves upon conventional anonymity protection methods and simultaneously ensures quality data reporting to an analyst. For example, unlike conventional systems, the anonymity protection system protects respondent anonymity by implementing anonymity thresholds and genericizing text responses. Further, the anonymity protection system implements these thresholds in a flexible user-dependent, data field-dependent manner, and as needed basis. The result is that the anonymity protection system provides a level of anonymity protection that conventional systems were not able to provide.

While ensuring the anonymity of respondents, the anonymity protection system also provides powerful data analytics tools that automatically modifies data output that most closely provides the data which an analyst requested, but also ensures the protection of respondent anonymity. To accomplish this, the anonymity protection system may determine new demographic groupings that are non-identifying, but that provide an analyst with data similar to the requested filters. By proposing these modifications to data output, the anonymity protection system improves the efficiency of the anonymity protection system by minimizing the number of data requests an analyst must submit to identify an allowable data request, and thus prohibits the need for excessive processing, data report generation, and communication of data reports.

In addition, various embodiments of the anonymity protection system provide an improved graphical user interface for creating data requests. As explained above, the system can predetermine data requests that are not allowed by anonymity thresholds associated with a dataset and can remove or deactivate data request options within a graphical user interface so that a user can efficiently generate only data requests that meet the anonymity threshold. Indeed, example embodiments of the system include creating a dynamic graphical user interface that updates the availability of selectable data request options as a user selects one or more data request options. For example, the system may provide a data request graphical user interface that include options A, B, C, and D as selectable options to filter the data (A, B, C, and D may relate to data types such as geographic location, gender, age, position within a company, number years at a company, etc.). A user can select option A to create a data request that filters by data type A. Upon receiving an indication of the user selection, the system can dynamically update the graphical user interface to remove the selectable option B based on the fact that filtering the data by both A and B would result in breaching an anonymity threshold associated with the dataset. Accordingly, by dynamically updating the graphical user interface to provide only the options that satisfy the anonymity threshold, the system reduces the number of user interaction steps within the graphical user interface needed to create a data request that meets anonymity thresholds.

As illustrated by the foregoing discussion, the present disclosure utilizes a variety of terms to describe features and advantages of the report management system. Additional detail is now provided regarding the meaning of such terms.

For example, as used herein, the term "graphical user interface" refers to an interface that allows a user to interact with a client device through computer graphic visual indicators presented by a computer display (e.g., a computer monitor or screen). For example, a "graphical user interface" can include icons, selectable visual components, and display elements. To illustrate, a graphical user interface can include a report interface area and various data cards that display data in graphs, charts, comments, or word clouds. In addition, the graphical user interface can include data display areas, data fields, filtering options etc. The anonymity protection system can provide information to a client device that causes the client device to generate a graphical user interface and/or populate a graphical user interface with various graphical components and elements (e.g., via a web interface).

As used herein, the term "data" refers to electronic information. While the anonymity protection system disclosed herein is often discussed in terms of electronic survey response data or other data relating to electronic surveys, the described principles and functions of the system can be applied to a wide-variety of data received or generated from various sources.

As used herein, a "dataset" refers to a collection of data and can include any of a plurality of data types. As used herein, the term "data field" refers to any subset of data from a dataset. In particular, the term "data field" can include categories of data relating to traits of survey respondents, which may pose varying levels of identification risk. To illustrate, a "data field" can include the age, location, race, gender, or any other collected trait of a respondent.

As used herein, "data category" refers to a grouping of data within a data field. In particular, the term "data category" refers to the subsets formed by data categories. To illustrate, the data field "location" may include data categories "Salt Lake City" or "Las Vegas," while the data field "gender" may include data categories "male" and "female."

Additional features and characteristics of one or more embodiments of the system are described below with respect to the Figures. For example, FIG. 1 illustrates a block diagram of an example embodiment of an anonymity protection system 100 (or simply "system 100"). In general, and as illustrated in FIG. 1, the system 100 includes a reporting device 102 including a reporting application 104. Additionally, the reporting device 102 may be associated with an analyst 106. The system 100 generally also includes a survey administrator device 108 including a survey application 109. The survey administrator device 108 may also be associated with a survey administrator 110. In addition, the system 100 may include a respondent device 112 including a respondent application 114. The respondent device may be associated with a respondent 116.

The reporting device 102, the survey administrator device 108, and the respondent device 112 communicate, via the network 118, with the server device(s) 120, which may include an electronic survey system 122. As will be described in greater detail below, the devices 102, 108, 112 can perform or provide the various functions, features, processes, methods, and systems as described herein. Additionally, or alternatively, the server device(s) 120 can perform or provide the various functions, features, processes, methods and systems as described herein. In one or more embodiments, the devices 102, 108, 112 and server device(s) 120 coordinate together to perform or provide the various functions, features, processes, methods and systems, as described in more detail below.

Generally, the devices 102, 108, 112 can include any one of various types of client devices. For example, the devices 102, 108, 112 can be a mobile device (e.g., a smart phone), tablet, laptop computer, desktop computer, or any other type of computing device as further explained below with reference to FIG. 10. Additionally, the applications 104, 109, 114 can include any one of various types of client applications. For example, the applications 104, 109, 114 can be a web browser, and a user at the devices 102, 108, 112 may enter a Uniform Resource Locator (URL) or other address directing the web browser to a server device(s) 108. Alternatively, the reporting application 104 can be a native application developed for use on the client device 102.

Additionally, the server device(s) 120 can include one or more computing devices including those explained below with reference to FIG. 10. The reporting device 102, survey administrator device 108, respondent device 112, network 118, and server device(s) 120 may communicate using any communication platforms and technologies suitable for transporting data and/or communication signals, including any known communication technologies, devices, media, and protocols supportive of data communications, examples of which are described with reference to FIG. 11.

Although not a requirement, the anonymity protection system may be part of an electronic survey system. Accordingly, as shown in FIG. 1, the server device(s) 120 hosts an electronic survey system 122 (or simply survey system 122). In one or more embodiments, the survey system 122 collects survey responses to generate datasets (e.g., by administering an electronic survey to respondent users). In other embodiments, the server device(s) 120 can include a system other than survey system 122 for collecting datasets. Additionally, the server device(s) 120 can receive datasets via the network 118 from the reporting device 102, survey administrator device 108, or respondent device 112 or from another source.

As an initial overview of the anonymity protection system 100, the server device(s) 122 can receive anonymity values or access default anonymity values and apply to a dataset. Based on the anonymity values, the server device(s) 120 build modified data output in accordance with the anonymity values. As will be described in detail below, the server device(s) 120 generate data output using one or more anonymity processes and may visualize data output in the form of a data report or by real-time data filtering. Upon receiving the modified data output, the reporting device 102 displays the modified data output in a graphical user interface.

Figure 2:
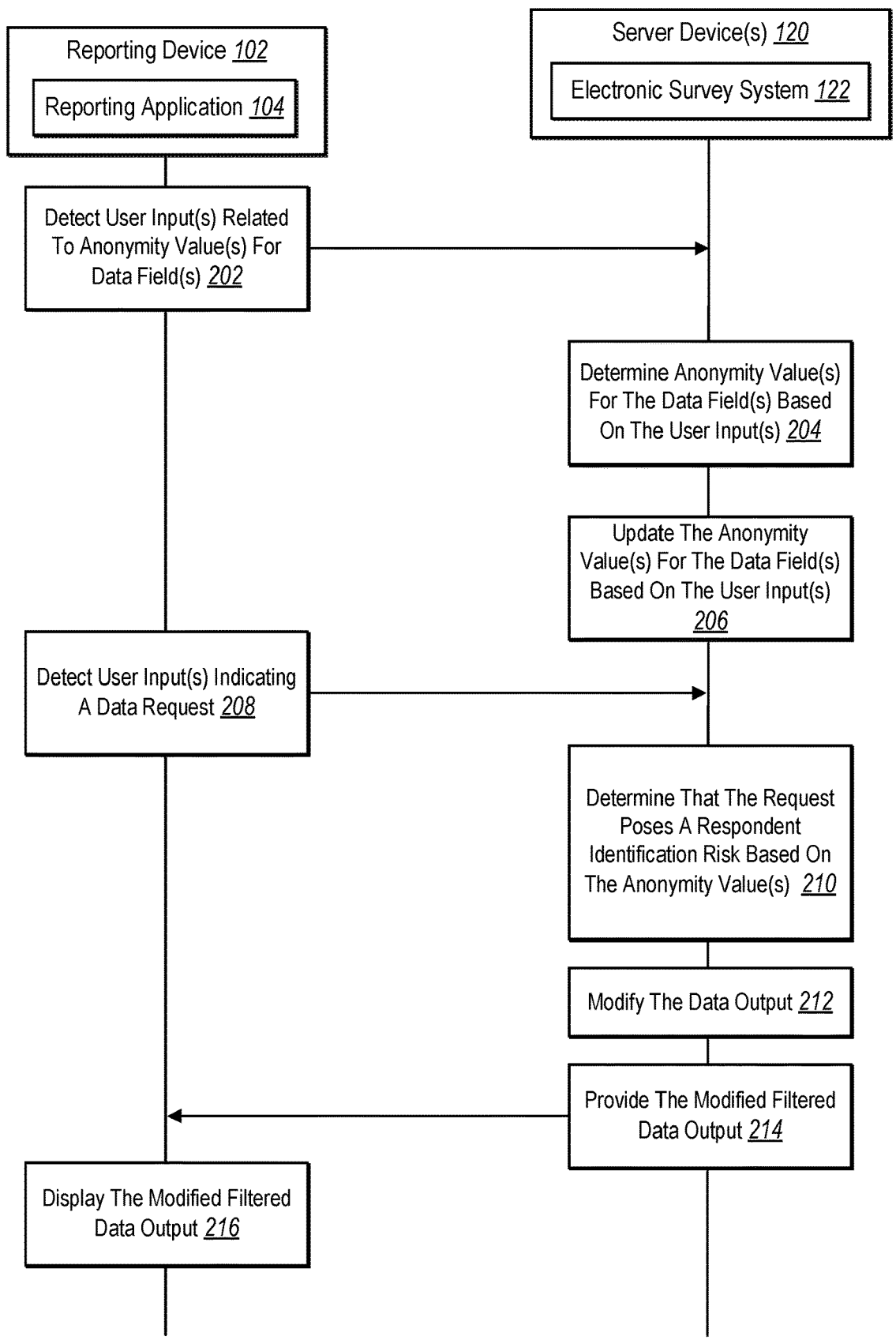
FIG. 2 illustrates a sequence-flow diagram for protecting anonymity of respondents by modifying data output in response to a data request in accordance with one or more embodiments.

FIG. 2 illustrates a flow diagram representing an overview of the process of maintaining respondent anonymity in a dataset. As shown in FIG. 2, the flow diagram includes a reporting device 102 and server device(s) 120, described above with regard to FIG. 1. In particular, FIG. 2 illustrates one example embodiment for maintaining respondent anonymity on a reporting device 102.

As illustrated in FIG. 2, the reporting device 102 may detect user input(s) related to anonymity value(s) for data field(s), as shown in step 202. While FIG. 2 illustrates that the reporting device 102 can provide anonymity values, in other instances, the system can automatically generate anonymity values based on data field definitions or receive anonymity values form other sources such as the survey administrator device 108. As used herein, the term "anonymity value" refers to any value the anonymity protection system determines for dataset that influences what anonymity protections are applied to that dataset. In particular, the term "anonymity value" can include an "anonymity threshold" or an "anonymity protection level," which will be discussed in greater detail with regard to FIGS. 3-4. The reporting device 102 may receive the user input in any of a variety of ways. The input may be via keyboard entry into a text field, a click on an array of options or on a dropdown menu, a touch or swipe on a touchscreen, or any other method of receiving user input.

The input related to anonymity values may be in various forms. As will be discussed in greater detail with regard to FIG. 6, the system may receive input that specifies a particular anonymity value, or input that gives a general "grade" or importance value for a data field. For example, the system 100 could detect user input indicating that the anonymity threshold for the "location" data field is 10. In another embodiment, the system 100 could receive user input indicating that anonymity values for the "location" data field should reflect a severity of 3 on a scale from 1-5. Thus, the system 100 may meet the needs of both a more sophisticated survey administrator 110 familiar with precise anonymity values he or she wishes to use and a less experienced survey administrator 110 who is more comfortable working with a general rating.

Additionally, the system 100 can receive input related to data fields individually or can select an anonymity values package that automatically populates the graphical user interface with anonymity values for multiple data fields. For example, the system 100 can receive input selecting a legal standard, industry standard, or default settings for a specified use case. In one or more embodiments, the system 100 may enable a survey administrator 110 to select this anonymity values package and subsequently change the anonymity values for one or more data fields to customize the package.

Upon detecting the user input(s), the reporting device 102 delivers the input(s) to the server devices 120. In response to receiving the user input(s), the server device(s) 120 may determine anonymity value(s) for the data field(s) based on the user input(s), as shown in step 204. As discussed above, the user input(s) could specify anonymity values or could simply indicate a "grade." Based on the user input "grading" various data fields, the system 100 may determine anonymity values. As will be discussed in greater detail below with regard to FIGS. 3-4, the system 100 may use various anonymity values to protect respondent anonymity. In one or more embodiments, determining anonymity values based on user inputs may include determining anonymity thresholds and anonymity protection levels. As discussed above, the user input may specify one or both of anonymity thresholds and/or anonymity protection levels for various data fields.

In one or more embodiments, the user may indicate a "grade" or "score" that indicates a general level of protection for a data field. Then, the system 100 may determine an anonymity threshold and an anonymity protection level for that data field based on the "grade" or "score." The determination of these anonymity values may further be based on various other factors, such as user data or various attributes of the dataset, such as the number of responses or respondents, the number of available data fields, and/or the type of data collected.

Similarly, in one or more embodiments, the user may specify a particular anonymity value for a particular data field. Then, the system 100 need not determine the specified anonymity value for that data field but may need to determine another anonymity value for the data field. For example, if a user has specified an anonymity threshold of 10 for the "location" data field, the system 100 may determine an anonymity protection level based in part on the specified anonymity threshold. As discussed above, the determination may also be based on a variety of other factors related to the dataset or the user.

After determining the anonymity values, the system may update the anonymity value(s) for the data field(s) based on the user input(s), as shown in step 206. In one or more embodiments, the system 100 may update the anonymity values to reflect the anonymity values that it determined as discussed above with regard to step 204. If the system 100 has not previously indicated any anonymity values for the dataset, the system 100 may update to reflect that the system 100 has determined anonymity values for the data set. If the system 100 has previously indicated anonymity values for the dataset, the system 100 may update to reflect the new anonymity values for the dataset.

The reporting device may detect user input(s) indicating a data request, as shown in step 208. As used herein, the term "data request" refers to any user request to view data of any kind. In particular, a "data request" may include a system detection of user input indicating a request to view data. To illustrate, the term "data request" can include a "data filtering request" or a request to view unfiltered data. Additionally, the system may receive this input in a variety of data reporting contexts. For example, in one or more embodiments, the input requesting data could be in the context of a request to receive a data report reflecting certain parameters. In one or more other embodiments, the input requesting data could be a selection of a portion of data in a graphical user interface. Upon detecting the user input(s), the reporting device 102 delivers an indication of the user input(s) to the server device(s) 120.

In response to receiving the user input(s), the server device(s) 120 may determine that the request poses a respondent identification risk based on the anonymity value(s), as shown in step 210. As will be discussed in greater detail with regard to FIGS. 3-4, the system 100 may determine that the requested data does not comply with one or more of the anonymity values that the system 100 determined in step 204. Accordingly, the system 100 may determine, based on the determination that the requested data does not comply with one or more anonymity values for a relevant data field, that the request poses a risk that a respondent's anonymity will be compromised.

Based on this determination, the server device(s) 120 may modify the data output, as shown in step 212. As used herein, the term "modified data output" refers to any visualization of data that the report management system has changed the presentation of in order to protect the anonymity of respondents. In particular, the term "modified data output" can include "modified filtered data output" and "genericized text output."

Again, as will be discussed in greater detail with regard to FIGS. 3-4, the system 100 may modify the data output in various ways based on the requested data and the corresponding anonymity values. For example, as discussed in detail with regard to FIG. 3 the system 100 may modify data output by disallowing certain filtering combinations and/or by offering alternative non-identifying filtering combinations. The system 100 may also genericize text responses using a variety of methods discussed in greater detail with regard to FIG. 4. Then, the server device(s) 120 may provide the modified data output to the reporting device 102, as shown in step 214.

Finally, upon receiving the modified data output, the reporting device 102 may display the modified data output, as shown in step 216. The system 100 may display the modified data output in any of a variety of ways, including in a variety of graphical user interfaces. For example, in one or more embodiments, the reporting device 102 may display the modified data output on a document that the server device(s) provide. In another embodiment, the reporting device 102 can display the modified data output included in a graphical user interface and/or a data reporting area of a graphical user interface.

Figure 3:
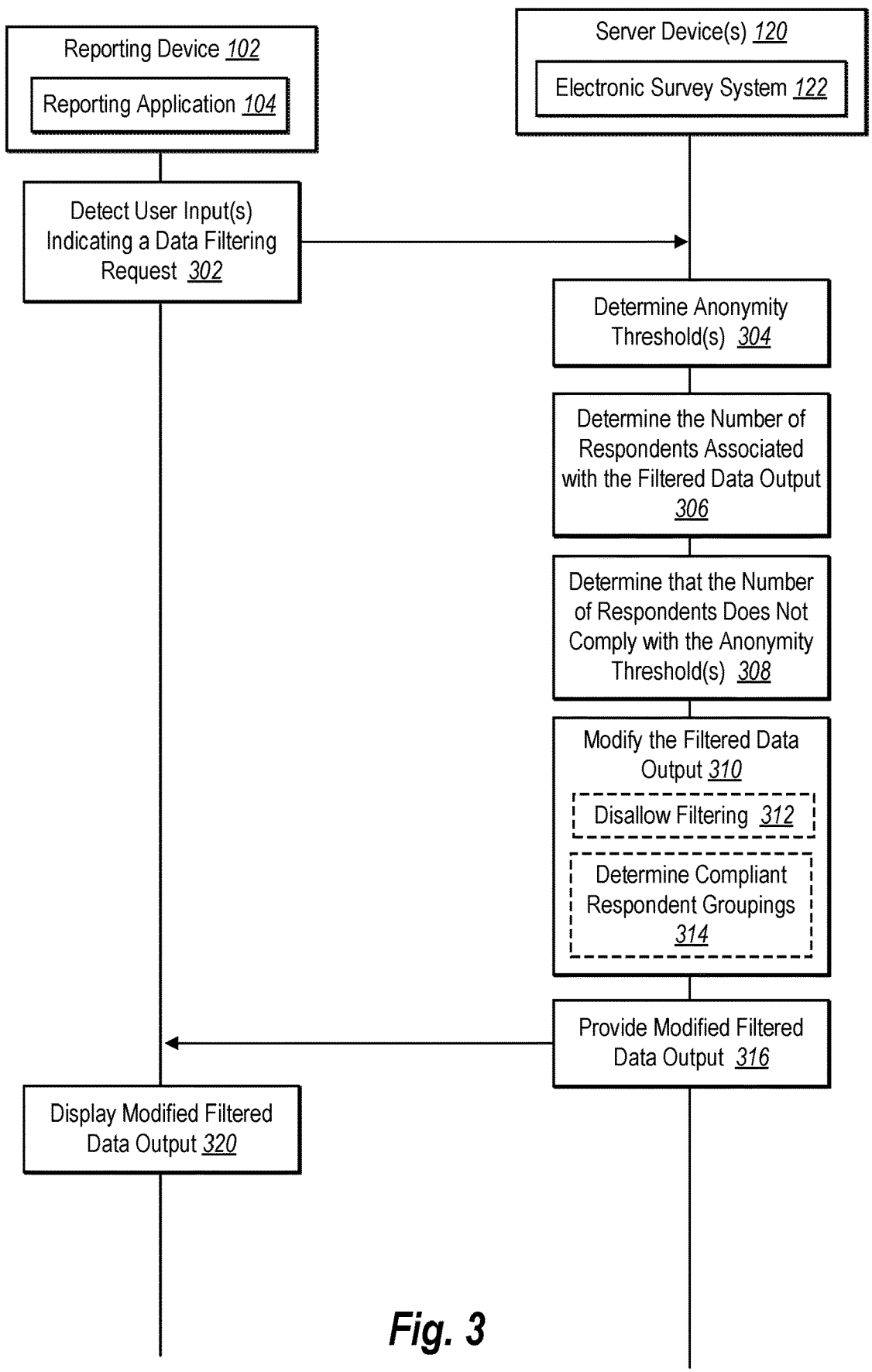
FIG. 3 illustrates another sequence-flow diagram for protecting anonymity of respondents by modifying data output in response to a data request in accordance with one or more embodiments.

FIG. 3 illustrates a flow diagram representing the process of modifying filtered data output from a data filtering request based on one or more anonymity thresholds in order to provide filtered data output. As shown in FIG. 3, the flow diagram includes the reporting device 102 and server device(s) 120, described above with regard to FIG. 1. In particular, FIG. 3 illustrates one example embodiment for maintaining respondent anonymity on a reporting device 102.

As illustrated in FIG. 3, the reporting device 102 may detect user input(s) indicating a data filtering request, as shown in step 302. As used herein, the term "data filtering request" refers to a user request to view only data related to one or more indicated data categories from one or more data fields. In particular, the term "data filtering request" can include a user request to "drill down" on data categories related to various data fields in order to view data trends among specific data categories. To illustrate, a "data filtering request" can include a request to view data related only to one or more of a specified age range, a specified location, a specified race, and/or a specified gender.

As discussed above, prior to receiving user input indicating a data filtering request, the system can determine a plurality of data request options to activate within a data request graphical user interface based on anonymity threshold associated with a dataset. In such an embodiment, the system performs an analysis on the dataset to identify data request options and combinations that meet the anonymity threshold, and provides those options to the reporting device 102 via a graphical user interface. As the system receives indications of the user input in selecting data request options, the system can dynamically update the graphical user interface with updated data request options that satisfy the anonymity threshold in view of the user-selected data request options. Thus, by providing only data request options that are predetermined by the system to meet anonymity thresholds, the system ensures that the final version of the data filter request satisfies anonymity thresholds and can process the data request and provide the filtered data output shown in step 320 without the need of performing the other steps.

In alternative embodiments, however, the system allows a user to create a data filter request, and then the system processes the request in a way to enforce anonymity thresholds. For example, in one or more embodiments, the data filtering request may be a request to generate a report with specific filtering parameters and may be received at a button on a report interface. In one or more other embodiments, the data filtering request may be received in a graphical user interface already displaying data from a dataset and may be received at a listing of a category of data to indicate a desire to filter for that data type. That is, in an example embodiment, the data filtering request could be a selection of the data category "women" under the data field "gender," and could indicate a desire to see only responses from respondents who identified as women in their survey. Further, in an example embodiment, the system 100 could receive another user input at the data category "Las Vegas" under the data field "location," and could further indicate a desire to see only responses from respondents who identified as women located in Las Vegas in their survey.

Upon receiving the data filtering request, the server device(s) 120 may determine anonymity threshold(s), as shown in step 304. The server device(s) 120 may determine the number of respondents associated with the filtered data output (which includes both filtered-in data and filtered-out data), as shown in step 306. Next, the server device(s) 120 may determine that the number of respondents in the filtered data output does not comply with the anonymity threshold(s), as shown in step 308. In one or more embodiments, if the number of respondents associated with the filtered data output is fewer than the number of respondents required by the anonymity thresholds related to the data filtering request, the filtering request does not comply with the anonymity thresholds.

In one or more embodiments, a data filtering request may implicate multiple anonymity thresholds, and in such embodiments, the server device(s) 120 can determine whether the number of respondents associated with the filtered data output complies with each implicated anonymity threshold. For example, if a data filtering request specifies a request for a data report for responses of men in Salt Lake City, the number of male respondents in Salt Lake City is 9, the anonymity threshold for gender is 8, and the anonymity threshold for location is 5, then the data thresholds for gender and location are satisfied. In addition, the system identifies the number of respondents associated with filtered-out data and determines there are a total of 12 respondents associated with a different gender and location compared to the request for male respondents in Salt Lake City. Accordingly, the total of 12 respondents in the filtered-out data also satisfies the gender threshold of 8 and location threshold of 5. Accordingly, the server device(s) 120 would determine that the number of respondents complies with an anonymity threshold.

In another example, however, it may be determined that the filtered-in data and/or the filtered-out data includes a number of respondents that are below the threshold for either or both of gender and/or location. In such a case, the system may determine that a data request is non-compliant because it filters to finely for one or more data fields. This determination may be done in conjunction with, or instead of, a determination as to whether a data filtering request complies with one or more anonymity thresholds.

Upon this determination, the server device(s) 120 may modify the filtered data output, as shown in step 310. As used herein, the term "modified filtered data output" refers to any visualization of data that the report management system has changed based on requested data filters presenting a risk of respondent identification. In particular, the term "modified filtered data output" can include a visualization of a filtered data report request that modifies the data included in the report from the data that was actually requested to different data that ensures that data filters don't allow a respondent to be identified. To illustrate, a "modified filtered data output" can include data output visualizing data with non-identifying data groupings similar to the requested groupings, data output showing unavailable filtering options, based determination in real-time that a filtering combination is identifying, and a graphical user interface disallowing visualization of filtered data based on an identifying combination of filters.

The server device(s) modify the filtered data output based on the determination that the data filtering request does not comply with one or more data thresholds of the dataset. In one or more embodiments, modifying the filtered data output can ensure that respondent anonymity is maintained, and protected to the extent of the relevant anonymity thresholds. The server device(s) 120 can modify the filtered data output in many ways, including rejecting a filtering request or determining a data filtering configuration similar to the received data filtering request that complies with the anonymity thresholds and building filtered data output based on the compliant data filtering configuration.

Modifying the filtered data output may cause the server device(s) 120 to disallow filtering, as shown in step 312. As described above with regard to modifying the filtered data output generally, the system may disallow filtering based on a filtering request failing to comply with one or more related anonymity thresholds. For example, in one or more embodiments, the system 100 may cause the reporting device 102 to display a message notifying the analyst that the data filtering request will not be completed because it poses a respondent identification risk. In one or more embodiments, this message may include a listing of the one or more data fields with associated anonymity thresholds that the data filtering request fails to comply with. In one or more other embodiments, this message may include alternate data filtering suggestions that are similar to the data filtering request but comply with all anonymity thresholds associated with the dataset.

The system 100 may also disallow a filtering request by disallowing filtering options in real-time. As discussed below with regard to FIG. 7, in one or more embodiments, the system 100 may utilize dynamic filtering to allow the analyst 106 to select and view data filters in real-time. In one or more embodiments, the system 100 may apply data filters to a visualization of data in a graphical user interface in real-time as the analyst 106 selects various data categories. Then, the system 100 may determine whether a data filtering request further including selection of any of the other data categories in the graphical user interface would comply with relevant anonymity thresholds. Based on these determinations, the system 100 can then render any noncompliant data filtering options unselectable.

For example, the system 100 can remove any data categories that, if added to a data filter, would yield a data filtering request that does not comply with one or more data thresholds. In another embodiment, the system 100 can visually indicate that the data categories are not selectable, such as by changing the text for these data categories to a different style or color or by changing another portion of their presentation in the graphical user interface. Though these examples are given for illustration, system 100 can make visually clear to the analyst 106 that these unselectable data categories are not available for further data filtering in any of a variety of ways.

To illustrate an example embodiment, in one or more embodiments, the analyst 106 may select the data category "men" in the data field "gender," and the system 100 may cause the reporting device 102 to display responses related to the selection if the filter complies with relevant data thresholds. Then, for example, the system 100 may determine that the age group "18-25" includes 15 respondents identified as men, the age group "26-33" includes 11 respondents identified as men, the anonymity threshold for age is 10, the anonymity threshold for gender is 15, and that therefore analyst 106 selection of the data category "18-25" in the data field "age" would comply with the relevant anonymity thresholds, but analyst 106 selection of the data category "26-33" would not comply with the "gender" anonymity threshold. Based on this determination, the system 100 can do one of two anonymity controls. For example, because the system applies the anonymity threshold to both filtered-in data and filtered-out data, the system can remove both the "26-33" range and the "18-25" range as a selectable filtering options to protect both the filtered-in data and filtered-out data. Alternatively, the system can group the "26-33" range and the "18-25" range together so that when viewed as a single group the number of respondents within the group meet the anonymity thresholds. It will be appreciated that while this example is given for purposes of illustration, the system 100 may disallow filtering for any of a variety of data categories in a variety of data fields in a variety of types of graphical user interfaces.

Additionally, modifying the filtered data output may cause the server device(s) 120 to determine compliant respondent groupings, as shown in step 314. When a user makes or attempts to make a data filtering request that does not comply with anonymity thresholds, the system 100 may also propose an alternate data filtering request that both (1) provides data similar to the data requested in the noncompliant data filtering request, and (2) complies with all relevant anonymity thresholds.

The system 100 may determine compliant respondent groupings by combining multiple data categories into a data category that satisfies the relevant data threshold(s). The system 100 may determine these groupings by determining two or more groupings that, together, would satisfy the threshold requirements, and combining those groupings for presentation to the analyst 106. The system 100 may determine these groupings based on one or more similarities between groups, such as respondents from two different but nearby locations, or respondents similar in age but not in the same default age range. The system 100 may also simply combine two or more of the smallest groups in order to comply with relevant anonymity thresholds.

For example, a data filtering request specifying the data category "women" from the data field "gender" and the data category "Los Angeles" from the data field "location" may yield a number of respondents that does not comply with relevant anonymity thresholds for both filtered-in and filtered out data. However, the system may determine that a data filter specifying the data category "women" from the data field "gender" and both the data category "Los Angeles" and the data category "San Francisco" from the data category "location" will yield a number of respondents that does comply with the relevant anonymity threshold for both filtered-in and filtered-out data. Based on this determination, the system 100 may modify the filtered data output to reflect the compliant respondent groupings rather than displaying the potentially identifying filter or solely disallowing the filter. It will be appreciated that while this example is given for illustration, the system 100 may determine compliant respondent groupings for any of a variety of data categories in a variety of data fields in a variety of types of graphical user interfaces.

The system may also generate new groupings to provide to the analyst 106. For example, the system may determine a new range in a data field where doing so makes sense, such as age, height, or weight. For example, the system 100 may receive a noncompliant filtering request to see women age 35-40 and generate a new compliant grouping of women age 35-42 in response. Additionally, the system 100 may, when determining alternate compliant groupings, base this determination in part on one or more user profile settings of the requesting analyst 106. Further, the system may base the determination in part on one or more previous user interactions with the system 100 associated with the user profile of the requesting analyst 106.

After modifying the filtered data output, the server device(s) 120 may provide the modified filtered data output to the reporting device 102, as shown in step 316. Then, the reporting device 102 may display the filtered data output, as shown in step 320. Similar to the discussion above with regard to step 216 in FIG. 2, the system 100 may display the modified data output in any of a variety of ways, including in a variety of graphical user interfaces.

Figure 4:
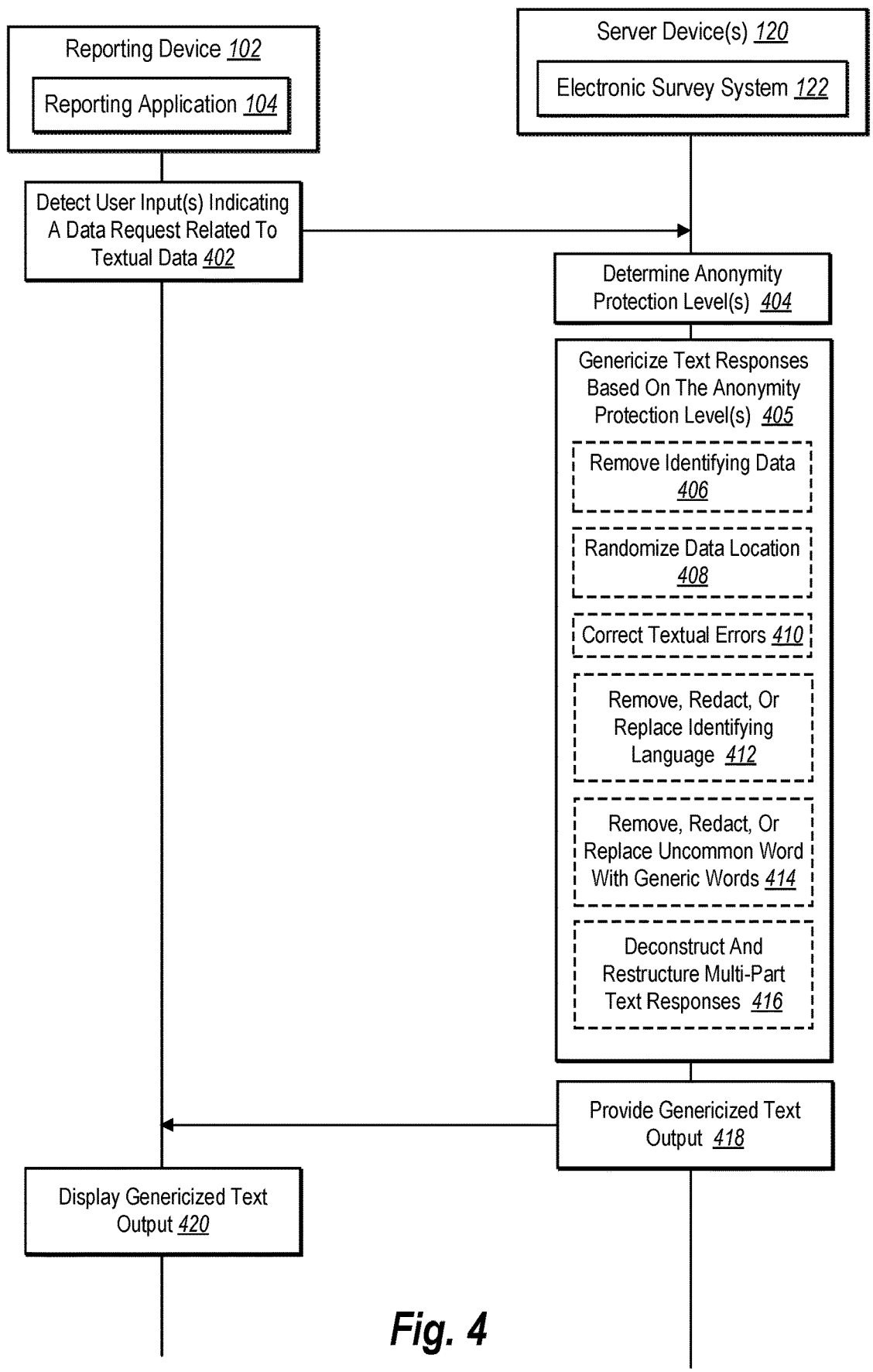
FIG. 4 illustrates a sequence-flow diagram for protecting anonymity of respondents by genericizing text responses in accordance with one or more embodiments.

FIG. 4 illustrates a flow diagram representing the process of genericizing text responses for a data request related to potentially identifying textual data and providing those genericized text responses to the analyst 106. As shown in FIG. 4, the flow diagram includes the reporting device 102 and server device(s) 120, described above with regard to FIG. 1. In particular, FIG. 4 illustrates one example embodiment for maintaining respondent anonymity on a reporting device 102.

As illustrated in FIG. 4, the reporting device 102 may detect user input(s) indicating a data request related to textual data, as shown in step 402. Similar to receiving user inputs as discussed above, the system 100 may receive the user input in any of a variety of ways. The input may be via keyboard entry into a text field, a click on an array of options or on a dropdown menu, a touch or swipe on a touchscreen, or any other method of receiving user input.

Upon receiving the data request, the server device(s) 120 may determine anonymity protection level(s), as shown in step 404. As used herein, the term "anonymity protection level" refers to a system-required standard of genericization for text responses in order to present the responses to a user. In particular, the term "anonymity protection level" can include system-required procedures to generate genericized text output by performing various genericization processes. To illustrate, an "anonymity protection level" can include genericization requirements determined by a user, determined by the system based on user input, and/or determined by the system based on the dataset itself.

The server device(s) 120 may genericize text responses based on the anonymity protection level(s), as shown in step 405. As used herein, the terms "genericized text responses" and "genericized text output" refer to any visualization of textual data that the report management system based on a data request for textual data presenting a risk of respondent identification. In particular, the term "genericized text responses" or "genericized text output" can include text responses that the system has restructured and modified to protect respondent anonymity. To illustrate, a "genericized text responses" and "genericized text output" can include data output for which the anonymity protection system has corrected textual errors, removed or redacted identifying language, replaced uncommon words with generic words, and totally deconstructed and restructured multi-part text responses.

The server device(s) may genericize one or more text responses using one or more of a variety of methods, as described below. Further, the server device(s) may determine what methods 406-416, and to what extent, to implement based in part on one or more anonymity protection level(s) associated with the relevant data set. Further, as discussed below with regard to FIGS. 5A-5B, the system may also determine what methods 406-416, and to what extent, to implement based in part on one or more user permissions associated with the user account of the analyst 106 requesting to view the data. Further, one or more user settings may determine which methods may be used.

As part of genericization of text responses, the server device(s) 120 may remove identifying data, as shown in step 406. In one or more embodiments, the server device(s) 120 can remove the respondent name, IP address, or any other identifying data from the text responses. In another part of genericizing text responses, the server device(s) 120 may randomize location data, as shown in step 408. To further genericize text responses, the server device(s) 120 may correct textual errors, as shown in step 410. In one or more embodiments, an analyst 106 may be familiar with the writing style of one or more respondents 116 and may be able to identify common errors or typos that various respondents 116 make. In such a situation, textual errors may pose an identification risk. However, the system 100 may identify and correct any textual errors from text responses in order to eliminate this risk.

Additionally, as part of genericization, the server device(s) 120 may remove, redact, or replace identifying language, as shown in step 412. In one or more embodiments, a respondent 116 may include one or more identifying words or phrases in their text responses. For example, a respondent may mistakenly include their name, the name of another employee, the name of their city, or an identifying pronoun in their response. The system may determine whether the name, pronoun, or other language is identifying based on the response text, user settings, survey settings, and other considerations. The system 100 may then remove, redact, or replace the identifying language depending on the context and content of the language.

Similarly, the server device(s) 120 may also remove, redact, or replace uncommon words with generic words, as shown in step 414. In one or more embodiments, some respondents may use uncommon words or phrases that may pose an identification risk, especially in a situation in which the analyst 106 may be familiar with one or more respondents 116. For example, a respondent 116 may frequently use a distinctive word or phrase that may pose an identification risk. For another example, respondents 116 may use regional words or phrases that may either be identifying of a respondent's 116 location or of a respondent 116 who grew up in a certain region (e.g. soda, pop, coke). The system may remove, redact, or replace these distinctive words or phrases to address the identification risks that they may pose.

For another part of genericizing text responses, the server device(s) 120 may deconstruct and restructure multi-part text responses, as shown in step 416. In contexts in which an analyst 106 is familiar with the writing of one or more respondents 116, long text responses may pose an identification risk, as they may make obvious the voice or style of a respondent. However, to alleviate this identification risk, the system may break apart and restructure multi-sentence or multi-part responses and provide various restructured response portions to the analyst 106 scrambled or out of order, so that it is unclear which segments were originally part of the same responses.

To illustrate, the system 100 may, based on the content and context of the text response, determine appropriate segments, sub-sentiments, or sub-statements of one or more sentences from text responses. In other words, the system 100 may identify various topics and sub-topics within a text response and may break the text response into smaller pieces based on the identified topics and sub-topics. The portions of these segments may then be restructured or re-ordered to make sense as an independent thought. The restructuring may also add "noise" or filler to make restructured segments more readable, and to further genericize the segments. These segments may then be presented in a randomized order, or organized by theme, or in any of a variety of organizations that do not group the responses according to respondent. Thus, the system 100 alleviates the identification risk of long text responses but gives the analyst 106 helpful material from the text responses.

After the genericization of text responses complies with the applicable anonymity protection level(s), the server device(s) 120 may provide genericized text output, as shown in step 418. After receiving the genericized text output, the reporting device 102 may display genericized text output, as shown in step 420. As discussed below with regard to FIG. 7A, the system 100 may display the genericized text outputs in a variety of ways, including in a variety of designs and graphical user interface types.

Figure 5A:
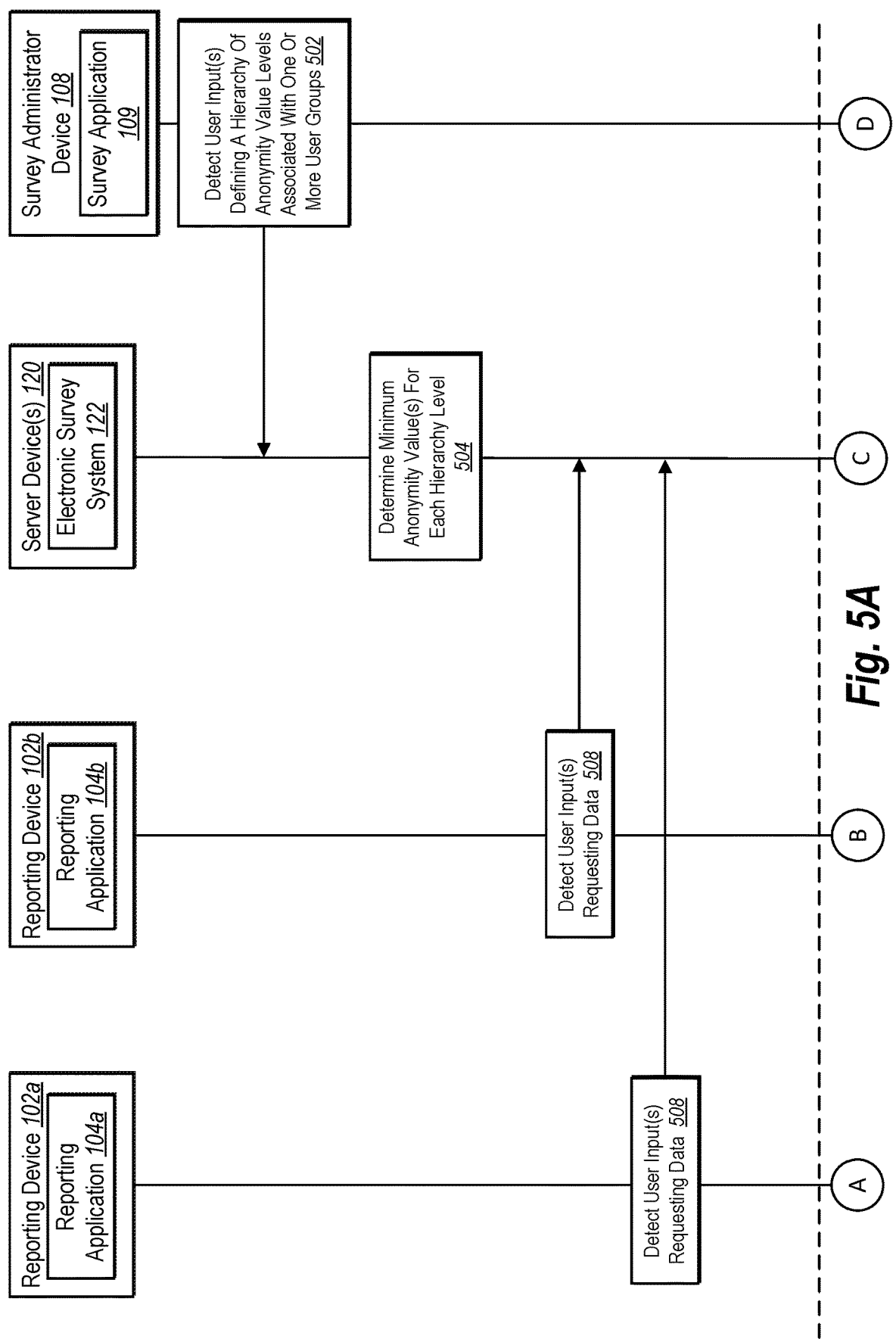
FIG. 5A-5B illustrate a sequence-flow diagram for providing data reports with varying levels of anonymity protection in accordance with one or more embodiments.
Figure 5B:
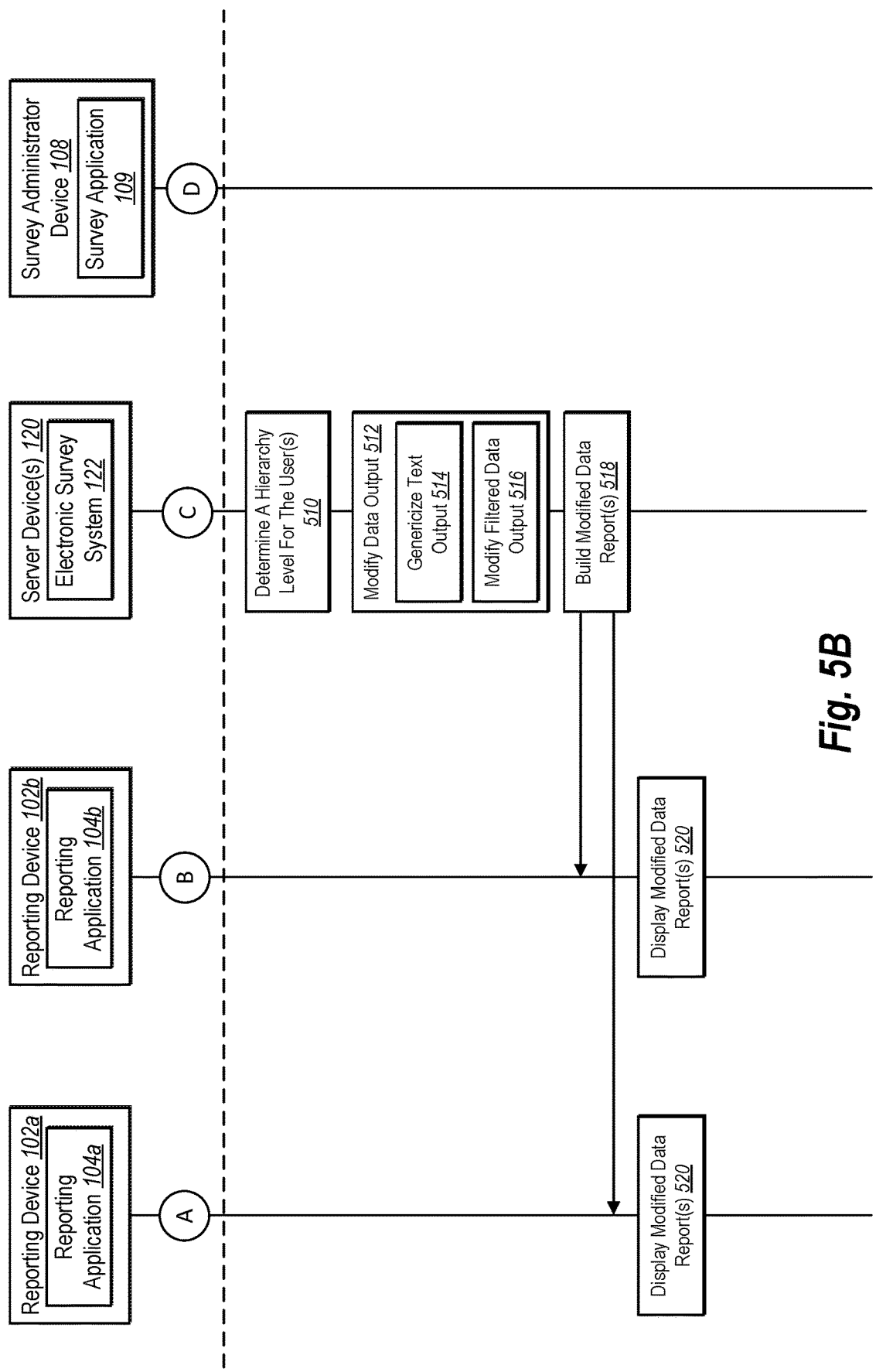

FIGS. 5A-5B illustrate a flow diagram representing an overview of the process of maintaining respondent anonymity in a dataset according to permissions set by the survey administrator 110. As shown in FIGS. 5A-5B, the flow diagram includes reporting devices 102a, 102b, the survey administrator device 108, and server device(s) 120, as described above with regard to FIG. 1. As illustrated in FIG. 5A, the survey administrator device 108 may detect user input(s) defining a hierarchy of anonymity value levels associated with one or more user groups, as shown in step 502. Similar to the discussion in FIGS. 2-4 above, the server administrator device 108 may receive the user input defining a hierarchy of anonymity value levels in any of a variety of ways in a variety of contexts, such as in a keyboard and mouse and/or touchscreen environment. Additionally, the user input indicating a data filtering request may be received at a variety of different user contexts, including a variety of graphical user interfaces.

The hierarchy of anonymity values may determine one or more permissions levels and may associate one or more anonymity values one or more user groups with a permissions level. To illustrate, in one or more contexts, identification risks may be higher with one group of analysts 106 than another group of analysts 106. In such a situation, the system 100 may enable a survey administrator 110 to assign permission levels, to one or more analysts 106. Thus, the system 100 provides increased flexibility to enable many users in an organization to view the most helpful non-identifying data for their situation and context.

Upon receiving the user input(s), the server device(s) may determine minimum anonymity value(s) for each hierarchy level, as shown in step 504. In various embodiments, these anonymity values may be determined based on user inputs received in step 502, user settings, survey settings, the dataset, or other factors. Each permissions level in the hierarchy may be associated with one or more anonymity values, and the system 100 will use each of the defined anonymity values for analysts 106 associated with a given permission level.

Reporting devices 102a, 102b may each detect user input(s) requesting data, as shown in step 508. Each of the reporting devices 102a, 102b may then deliver the input(s) to the server device(s) 120. In response to receiving these, as shown in FIG. 5B, the server device(s) 120 may determine a hierarchy level for the user(s), as shown in step 510. In one or more embodiments, the server device(s) may determine this hierarchy level based on the input(s) received in step 502. Then, the system 100 may use the anonymity value(s) associated with an analyst's 106 hierarchy permissions level when assessing the analyst's data requests. For example, the server may determine that the analysts 106 associated with the reporting devices 102a, 102b are associated with two different hierarchy permissions levels.

Based on this determination, the server device(s) 120 may modify data output, as shown in step 512, and as described in greater detail above with regard to FIGS. 3-4. Specifically, the server device(s) 120 may genericize text output, as shown in step 512, and as described in detail with regard to FIG. 4. The server device(s) 120 may also modify filtered data output, as shown in step 516, and as described in detail with regard to FIG. 5. In one or more embodiments, because the system 100 modifies data output based on relevant anonymity values, if two analysts 106 are associated with different permission levels, the system 100 may respond to data requests differently, depending on the anonymity values associated with an analyst's assigned hierarchy permission level.

Finally, based on the modified data output, the server device(s) 120 may build modified data report(s), as shown in step 518. As described above, the server device(s) build these data report(s) based on a data request, relevant anonymity values determined in part by a requesting analyst's 106 hierarchy permission level, and other considerations. Similar to the discussion above with regard to FIGS. 3-4, upon receiving the modified data reports, the reporting devices 102*a*-102*b* may display modified data report(s), as shown in step 520.

In addition to assigning different users different permission levels based on a user's position within an organizational hierarchy, the system 100 can automatically protect respondent identity within an organizational hierarchy by verifying that data breakouts based on organizational hierarchy (e.g., a data request including a filter by team) meet an anonymity threshold. Indeed, and as briefly mentioned above, the anonymity protection system can take various actions with respect to data corresponding to an organization hierarchy (e.g., to maintain the anonymity of employees that participate in an organization survey such as an employee satisfaction survey). Filtering data based on organizational hierarchies presents a unique problem to survey data anonymity because many organizations are built with teams or departments made of a small number of members (e.g., less than 5). Often managers want to view and analyze response data based on team or department, however, because of the small number of people within some teams, providing data based on team often results in a breach of anonymity.

Figure 5C:
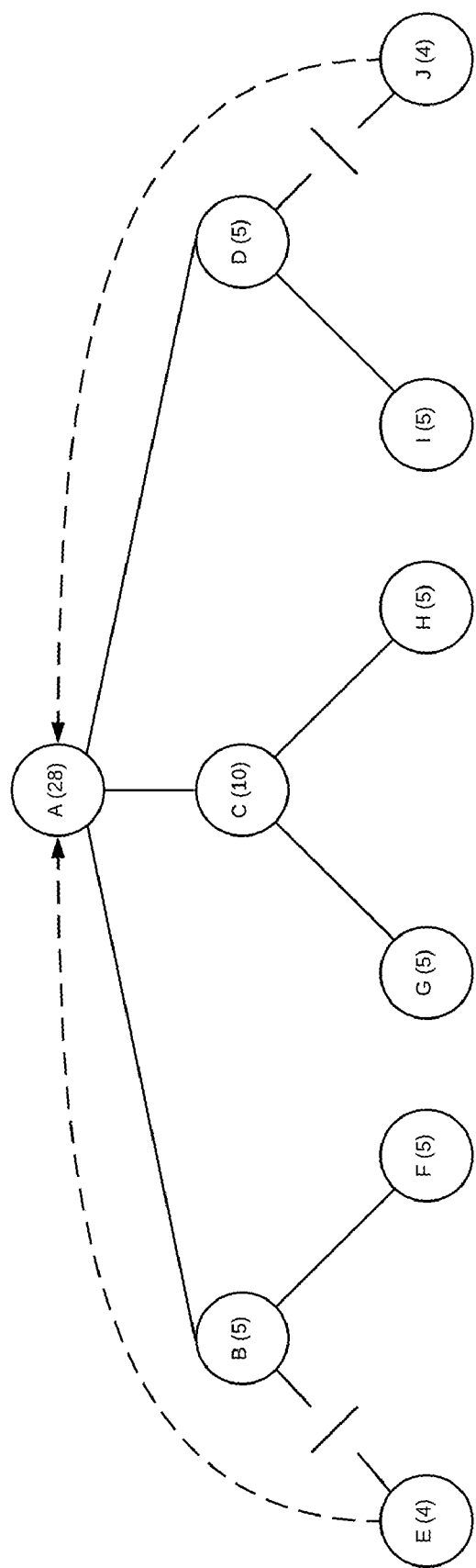
FIGS. 5C-5D illustrate example organizational diagrams in accordance with one or more embodiments.

FIG. 5C represents an example organizational hierarchy that includes teams A through J. As illustrated in FIG. 5C, teams E through J can be considered child units that each have a parent unit. In particular, parent unit B is associated with child units E and F; parent unit C is associated with child units G and H; and parent unit D is associated with child units I and J. Moreover, parent units B, C, and D are all associated with grandparent unit A. While FIG. 5C shows a particular number of child, parent, and grandparent units, it is understood that the number of units or particular organizational structure in FIG. 5C is for explanatory purposes and that the principles described with respect to FIG. 5C can be applied to an organizational hierarchy that includes any number of units, any number of levels, and any organization of units and levels.

As additionally shown in FIG. 5C, each unit has a particular number of team members, as indicated in the parenthetical within each unit. For instance, child units E, F, G, H, and I have five (5) members each, whereas child unit J has four (4) members. Parent units B and C each of ten (10) members because in the example shown in FIG. 5C the number of members in the parent unit is a sum of the members in the associated child units. Similarly, grandparent unit A includes twenty-nine (29) members because it is the sum of the members of parent units B, C, and D. (Note: it should be understood that although not illustrated in FIG. 5C, each of the parent units B, C, or D and the grandparent unit A could have additional direct reports and/or additional members such that the number of members at each of the parent or grandparent levels exceed the sum of the associated child units. Direct reports and additional members will be discussed below with respect to ensuring anonymity in such situations). Continuing with the example in FIG. 5C, the system may set an anonymity threshold at five (5) members (e.g., a data breakout that includes filtered-in data or filtered-out data of a team with less than five members is prohibited). Accordingly, and as shown in FIG. 5C, team J has four (4) members, which is below the anonymity threshold.

The system can use a variety of means to protect the anonymity of team J members. For example, and as illustrated in FIG. 5C, the system can detect that a child unit (e.g., team J) has a number of members below the anonymity threshold. Based on detecting the number of members in the child unit is below the anonymity threshold, the system can exclude the data associated with team J's members in response to receiving a data request for a data breakout of the child units I and J associated with team D, as represented by the broken line between D and J. In particular, based on receiving a data request for a data breakout of teams I and J, the system would provide only a data breakout for team I and exclude data associated with team J. Thus, the system would prevent any breakout of data that would isolate team J data (e.g., either as filtered-in data or filtered-out data) because the number of members in team J is below the anonymity threshold.

For example, the system excludes data associated with team J based on a data request for a data breakout of teams I and J since the filtered-in data associated with team J in such a breakout would be below the anonymity threshold (e.g., 4 members of team J versus an anonymity threshold of 5). In addition, based on a data request to breakout data based on team D, the system also excludes data associated with team J from such a breakout. In particular, the system determines that including team J data in a data breakout for team D would breach the anonymity threshold because if the data associated with team J were to be included within the data associated with team D (e.g., combined with team I data), then a user could use the filtered-in data associated with team D (e.g., team I and team J data) to cross with the filtered-in data of team I, and thereby specifically isolate data for team J—a data breakout that is below the anonymity threshold. Accordingly, the system determines that team J data also is excluded from a data breakout for team D. Therefore, as shown in FIG. 5C, the data breakout for team D includes only 5 members, i.e., the members of team I. The system treats team E data in the same way as team J, as illustrated in FIG. 5C with respect to team B. Notably, a breakout for team C data includes 10 members (i.e., team G and H) because the numbers of users in the filtered-in data, filtered-out data, and cross-filters are all equal to or greater than the anonymity threshold of 5.

The system can, however, provide team J data and team E data based on determining that it is not possible to isolate team J or team E data based on either filtered-in, filtered-out, or cross-filters. In particular, based on a receiving a data request to breakout the data by team A, the system groups the data from teams B, C and D together. In addition, the system determines that because it is not possible to isolate team J or team E data when combined with teams F, G, H, and I, the system can include team J data and team E data within the data breakout of team A, as illustrated in FIG. 5C by the dashed line between team J and team A and the dashed line between team E and team A. Accordingly, the system improves data security and anonymity by excluding data within a potentially identifying data breakout, but at the same time, allows such data to be included in data breakouts when the data is cannot be isolated (e.g., combined with other units so that the filtered-in data, filtered-out data, and any cross-filters are below the anonymity threshold).

As mentioned above, various organizational structures include individual employees that directly report to a manager. In these situations, the individual direct report is not included on a team, and accordingly poses a risk to be identified in data breakouts. Accordingly, in one or more embodiments the system can detect a direct report within the hierarchal structure and perform various actions to ensure the anonymity of the direct report. For example, the system can create a virtual team by combining multiple direct reports (e.g., 5 or more direct reports in the example discussed with respect to FIG. 5C). Moreover, the system can add a direct report to an existing team. For instance, if there was a direct report to parent D in FIG. 5C, the system could determine to group the direct report with team J based on determining that such a grouping would result in meeting the anonymity threshold. Finally, and similar to what was discussed above, the system could determine to simply exclude data associated with a direct report at the child level (e.g., the direct report is considered a team that includes a single member), but then the system can add in the data associated with the direct report at the higher level when the system combines direct report data with other child unit data.

Figure 5D:
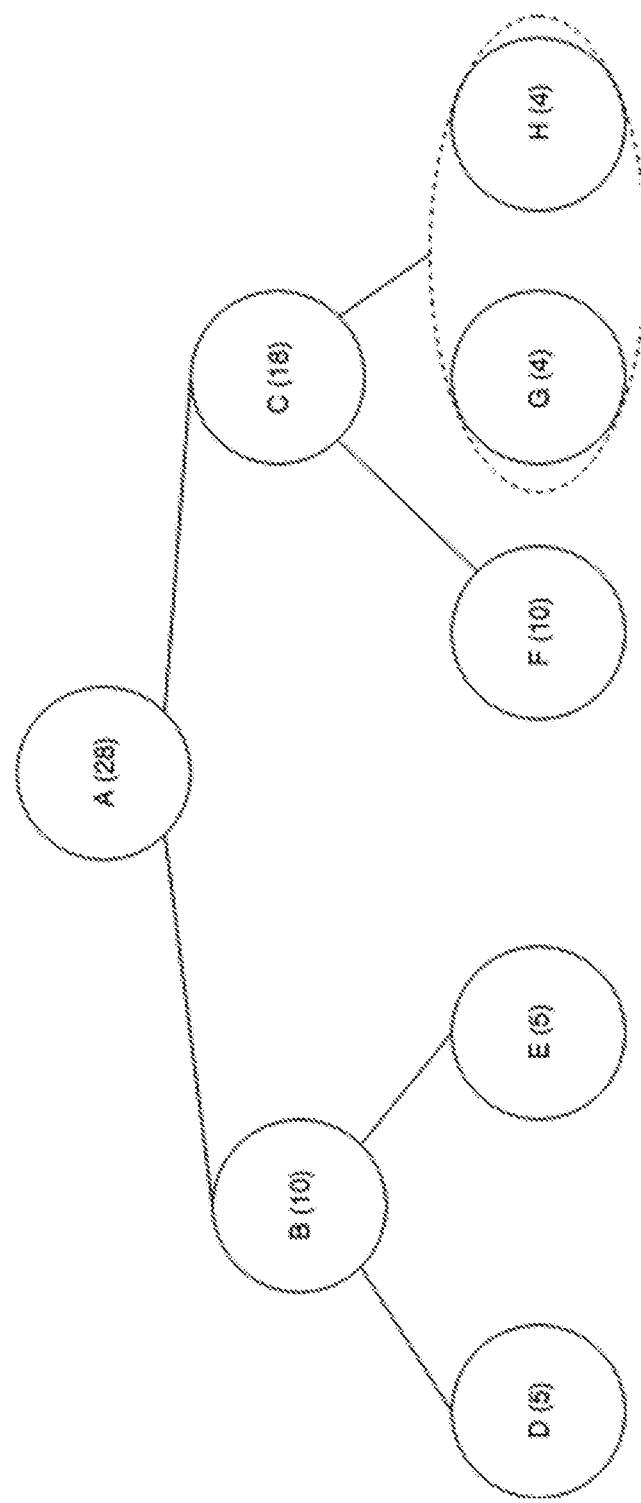

As just mentioned with respect to direct reports, the system can determine to group hierarchical units together to protect the anonymity of individuals within each unit. FIG. 5D illustrates an example of grouping data or creating a virtual group by combining two child units. As illustrated in FIG. 5D, a hierarchical structure includes grandparent unit A, parent units B and C, and child units D, E, F, G, and H. As with FIG. 5C, the numbers of members within each unit is indicated by the number in the parenthetical within each unit shown in FIG. 5D. As indicated, teams G and H each have four (4) members, which does not satisfy an example anonymity threshold of five (5) members. However, different from FIG. 5C in which the parent unit was associated with only two child units, in FIG. 5D the parent unit is associated with three child units, which provides the ability to group units in a way that simply doesn't result in a data breakout that represents a parent unit. Accordingly, the system can analyze the number of members within each of the child units and determine if there is a combination of groupings of child units that would result in each group meeting the anonymity threshold.

For example, and as illustrated in FIG. 5D, the system can determine that grouping teams G and H together would result in a total number of group members of eight (8), which does meet the anonymity threshold and that team F with ten (10) members meets the anonymity threshold. Thus, the system creates a virtual group that includes both the members of team G and H. Accordingly, based on receiving a data request for a data breakout of the child units under team C, the system provides a breakout that includes data corresponding to team F and combined data corresponding to both team G and H. Importantly, the system provides the combined data corresponding to both team G and H in a way that does not identify team G or team H members in isolation, and the system prohibits sorting or filtering of data by either team G or team H in isolation. In other words, and as indicated by the dashed oval shown in FIG. 5D, the data corresponding to teams G and H are provided and displayed as if they were single team.

While FIG. 5D includes only a grouping of two teams, the system can combine any number of teams to create a virtual group to meet an anonymity threshold. For example, the system could determine to combine a three or four units to create a virtual team that meets an anonymity threshold.

Indeed, in one or more embodiments, the system analyzes the number of teams and the number of team members within each team to determine one or more groupings that maximize the total number of groupings associated with a parent unit while also ensuring that each of the groupings meets the anonymity threshold.

Figure 6:
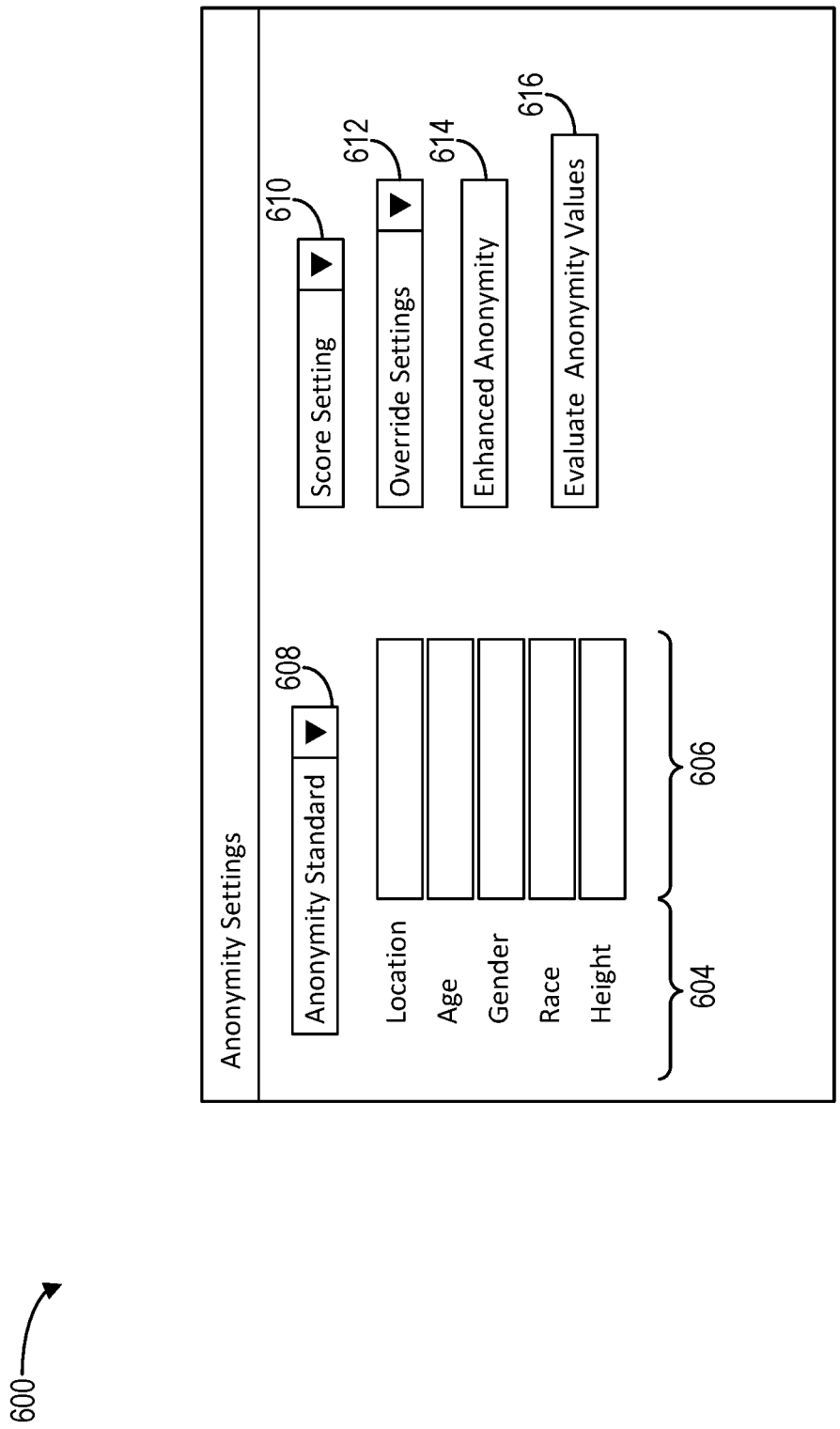
FIG. 6 illustrates an example graphical user interface for showing a plurality of options and settings for survey anonymity protections in accordance with one or more embodiments.

FIG. 6 shows an example graphical user interface for a plurality of options and settings for survey anonymity protections in accordance with one or more embodiments. More specifically, FIG. 6 illustrates an anonymity settings interface 600 that allows an analyst 106 or a survey administrator 110 to determine anonymity settings for one or more datasets, including for survey responses.

In one or more embodiments, the system can provide a user interface that allows a user to specifically identify data fields or data categories on which to apply anonymity protection. As discussed below, the interface can allow a user to score or grade specific data fields. Alternatively, the system can simply provide a check box next to data field types (e.g., data field names) that allow a user to quickly indicate the need for anonymity protection on the data field. Accordingly, a user can, with a single selection, apply an anonymity control on a data field throughout one or more datasets that include that data field. For instance, the system can receive an indication that a user selected a check box next to the "age" data field and apply anonymity controls for any age data across all data sets associated with the user.

As shown in FIG. 6, the anonymity settings interface 600 may include data fields listing 604. As discussed above, a data field is a subset of data relating to traits of survey respondents, which may cause varying levels of identification risk. Accordingly, the anonymity settings interface 600 includes an enumeration or listing of relevant data fields that may be, have been, or will be included in the data set. It will be appreciated that though FIG. 6 shows a listing of five particular data fields, that the data fields listing 604 may include any number of data fields and could include alternate data fields to those shown in FIG. 6. For example, in one or more embodiments, the data fields listing 600 could include the data fields sexual orientation, weight, hair color, education level, household income, or any of a plurality of possible data fields.

In conjunction with the data fields 604, the anonymity settings interface 600 may include the data field input areas 606. The data field input areas 606 may receive user inputs related to corresponding data fields. For example, the data field input areas 606 can receive user inputs indicating an anonymity threshold or an anonymity "score" or "grade." As discussed above with regard to FIGS. 2-4, these inputs may be used to determine various anonymity protection values corresponding to their related data fields.

Additionally, it will be appreciated that while FIG. 6 shows the data field input areas 606 as text fields, that the data field input areas 606 can receive input in any of a variety of ways. For example, in one or more embodiments, the data field input areas 606 can include drop down menus, multiple choice options, sliding scales, or any of a variety of input area types.

As briefly discussed above with regard to FIG. 2, the anonymity settings interface 600 may include an anonymity standard input area 608. In one or more embodiments, the anonymity standard input area 608 may receive user input requesting a predetermined anonymity standard. The user input may request anonymity standards based on industry standards, legal standards, default settings for a particular use case, or any of a variety of predetermined anonymity setting configurations.

In one or more embodiments, the system 100 may automatically populate data field input areas 606 with anonymity values in response to detecting user input selecting an anonymity standard. Further, in one or more embodiments, the data field input areas may still receive user inputs modifying the populated anonymity values, thereby allowing the user to customize a predetermined anonymity standard to fit their needs.

While FIG. 6 shows the anonymity standard input area 608 as a drop-down menu labelled "Anonymity Standard," it will be appreciated that the anonymity standard input area could conform to any of a variety of designs. For example, the anonymity standard input area could be shown as a multiple-choice menu, text box, or any other type of input area. Additionally, the anonymity standard input area could be labelled according to any of a variety of designs conveying to a user an anonymity standard.

Further, anonymity settings interface 600 may include the anonymity value setting input area 610. In one or more embodiments, the score setting input area 610 may receive user input indicating the type of anonymity value to be received at the data field input areas 606. For example, the anonymity value setting input area 610 may receive input indicating that anonymity thresholds, anonymity protection levels, or anonymity "grades" or "scores" will be input into the data field input areas 606. Similar to the discussion above related to the anonymity standard input area 608, though the anonymity value setting input area 610 is shown as a drop-down menu labelled "Score Settings," the anonymity value setting input area can conform to any of a variety of designs.

Additionally, the anonymity settings interface 600 can include the override settings input area 612. In one or more embodiments, it may be advantageous to remove anonymity settings for one or more individuals for whom identification is no longer a concern, or for whom identification is a lesser concern. Thus, in one or more embodiments, in response to user input at the override settings input area 612, the system may no longer apply anonymity protections to one or more respondents. In another embodiment, in response to user input at the override settings input area 612, the system may apply reduced anonymity protections to one or more respondents.

Thus, upon receiving user input at the override settings input area 612 related to one or more respondents, the system 100 may remove anonymity protections from responses submitted by those one or more respondents. Again, though FIG. 6 shows the override settings input area 612 as a drop-down menu labelled "Override Settings," the override settings input 612 area could conform to any of a variety of designs conveying that the input area allows the user to override anonymity settings for one or more respondents or respondent groups.

The anonymity settings interface 600 may further include the enhanced anonymity button 614. The enhanced anonymity button 614 may allow a user to toggle on and off enhanced anonymity. In one or more embodiments, upon detecting activation of the enhanced anonymity button 614, the system 100 may implement enhanced anonymity for a dataset. In the one or more embodiments, enhanced anonymity may set anonymity values so that the system disallows data filtering for any data field that includes any data category that does not comply with one or more relevant data thresholds.

For example, a data set of survey responses from 10 respondents may include responses from 9 men and 1 woman, and the anonymity threshold for the data field "gender" may be 5. Thus, though data filtering for the data category "women" would not be permitted, because only 1 respondent in the category does not comply with the anonymity threshold, if enhanced anonymity was not selected, the system 100 would still allow data filtering for the data category "men", because including 9 respondents in the category does comply with the anonymity threshold. However, because the analyst 106 could easily identify the one-woman respondent's responses simply based on determining which responses from the entire dataset are not present in the "men" data category. For example, without enhanced anonymity activated, the analyst 106 could observe that the respondents as a whole rated an experience 7.4/10, while respondents from the "men" data category rated the experience 8/10 and deduce based on this that the sole woman respondent rated the experience 2/10.

However, if a user activates the enhanced anonymity button 614, the system 100 will not allow data filtering for any data category in a data field that has even one data category that would not comply with relevant data thresholds. Thus, when the enhanced anonymity button 614 is activated, the analyst 106 will not be able to identify respondents based on deductions from relationships between data categories within a data field.

FIG. 6 shows the enhanced anonymity button 614 as a rectangle labelled "Enhanced Anonymity." In one or more embodiments, the enhanced anonymity button 614 may show a visual indication when a user has activated it, such as an alternate color or shading, or a visual effect that makes it appear pressed down. However, while FIG. 6 shows the enhanced anonymity button 614 as a rectangular button labelled with words, it will be appreciated that the system 100 may present enhanced anonymity button 614 in any of a variety of designs that indicate to a user that the enhanced anonymity button 614 receives user input related to enhanced anonymity settings. Further, the enhanced anonymity button 614 could receive a variety of user inputs in a variety of contexts, as described above.

The anonymity settings interface 600 may also include an evaluate anonymity values button 616. User interaction with the evaluate anonymity button 617 may, in one or more embodiments, cause the system to present evaluation information to the analyst 106. For example, in one or more embodiments, in response to receiving user interaction at the evaluate anonymity values button 616, the system 100 may determine, based on one or more datasets, potentially identifying data filtering combinations within the one or more datasets. Further, the system 100 may determine whether the currently selected anonymity values are sufficient to protect against these potentially identifying data filtering combinations and may suggest alternate anonymity values if the presently selected anonymity values are not sufficient.

The system 100 may present the information regarding potentially identifying combinations, whether the presently selected anonymity values protect these combinations, and alternate anonymity value suggestions in a variety of ways. For example, in one embodiment, the system 100 may present a message over one or more portions of the anonymity settings interface. In one or more other embodiment, the system 100 may send to or provide a user with an electronic document containing the evaluation information. Further, in still one or more other embodiments, the system 100 may integrate various pieces of the evaluation information into the anonymity settings interface at various locations. The system 100 may also present evaluation information according to any other design that conveys the evaluation information to the analyst 106.

Though FIG. 6 shows the evaluate anonymity values button 616 as a rectangle containing the words "Evaluate Anonymity Values," it will be appreciated that the system 100 may present evaluate anonymity values button 616 in accordance with a variety of designs that convey to the user that interaction with the evaluate anonymity values button 616 causes the system 100 to provide the user with evaluation information.

Figure 7A:
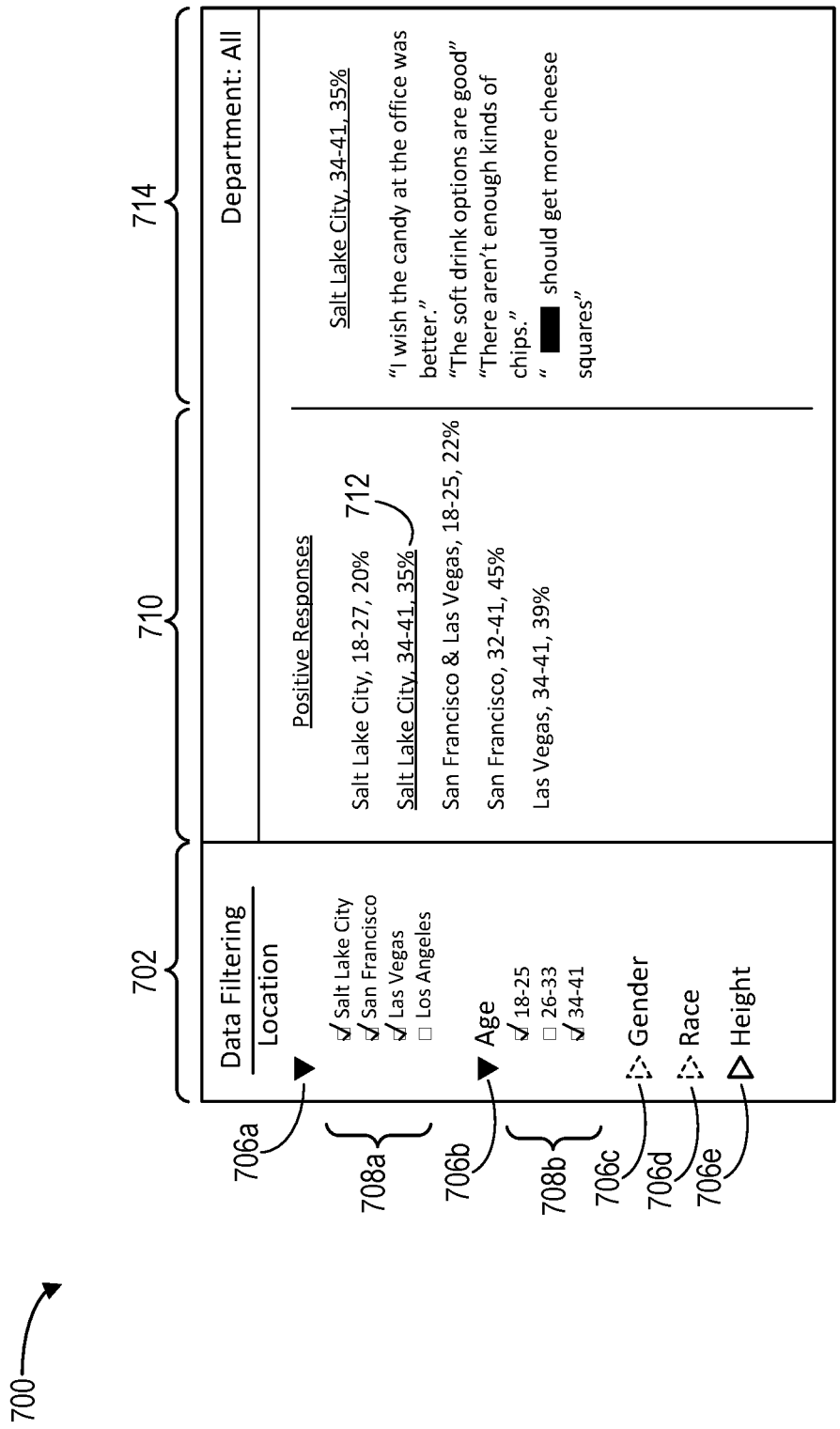
FIGS. 7A-7B illustrates an example graphical user interface for showing a plurality of data filtering options and data outputs in accordance with one or more embodiments.

FIG. 7A shows an example graphical user interface for a plurality of data displays and filtering options. More specifically, FIG. 7A illustrates a data filtering interface 700 that allows an analyst 106 to select data filters and view filtered data. As shown in FIG. 7A, data filtering interface 700 may include a data filtering input area 702. The data filtering input area may receive user input corresponding to data filtering options, and in response to this user input, the system 100 may present filtered data output in the data filtering interface 700. The data filtering input area may include a variety of options for data filtering and display. For example, the data filtering input area 702 may include data field options 706a-e and data category options 708a-b.

In one or more embodiments, the data filtering input area may include data field options 706a-e. The data field options 706a-e may include one or more data category options 708a-d. In one or more embodiments, the system 100 may, in response to user selection of one or more data field options 706a-e display one or more corresponding data category options 708a-b. Further, in one or more embodiments, the system 100 may, in response to user selection of one or more data category options 708a-b, receive a data filtering request including a filter for the selected data category option 708a-b. As discussed in detail above with regard to FIG. 3, the system 100 may modify filtered data output based on one or more anonymity thresholds associated with the filtered dataset.

Further, and also as discussed with regard to FIG. 3, the system 100 may determine, in real-time and in response to user selection of one or more data categories 708a-b, the system 100 may cause one or more noncompliant data filtering options to become unselectable. For example, as shown in FIG. 7A, data fields 706c-d include a dotted drop-down menu indicator, which indicates that the data fields 706c-d are unselectable, because the presently selected data filters render data filtering options included data fields 706c-d noncompliant with one or more relevant data thresholds. In contrast, data fields 706a-b include a filled-in drop-down menu indicator, which indicates that the data categories 706a-b are presently selected, and data field 706e includes an empty drop-down menu indicator, which indicates the data field 706e is available for data filtering, but unselected.

In one or more embodiments, when the system 100 dynamically determines, based on one or more anonymity values, that a data filtering option is no longer available to an analyst 106, the system 106 may present the analyst 106 with a notification informing the analyst 106 that one or more options are no longer available based on identification risks. For example, in one or more embodiments, the system 100 could, in response to an attempted selection of an unselectable data field 706a-e, provide a notification to the user that the attempted selection is not possible due to an identification risk, and/or that the analyst 106 must deselect one or more presently selected filtering options to filter based on the attempted selection. Further, in one or more embodiments, the system can, in the notification, inform the analyst 106 of one or more filtering options that the analyst 106 can modify in order to enable to attempted selection.

The data filtering interface 700 may also include a filtered data groupings area 710. As shown, this area includes a variety of modified and unmodified filtered data groupings based on the selected data fields 706a-b, and the data categories 708a-b that have received user input indicating a selection. In one or more embodiments, the filtered data groupings area may include one or more data types for the dataset. For example, FIG. 7A shows that filtered data groupings area 710 may include an indication of the percentage of positive responses for the given data grouping.

The system 100 may include one or more modified data groupings and one or more unmodified data groupings in the filtered data groupings area. As discussed above with regard to FIG. 3, the system 100 may present alternate data filtering groupings when selected groupings do not comply with relevant anonymity thresholds. As discussed above with regard to FIG. 3, the system 100 may present filtered data groupings may be unmodified or may modify one or more data groupings.

For example, FIG. 7A shows that various data categories 708a-b are selected. Based on these selections, the system 100 may determine various data groupings. The unmodified data grouping "Las Vegas, 34-41" and "Salt Lake City, 34-41" simply includes a data filter for two selected data categories 708a-b. However, the modified data grouping, "San Francisco & Las Vegas, 18-25" shows that the system 100 combined two filtered data groupings in order to comply with relevant anonymity thresholds, as discussed above with regard to FIG. 3. Similarly, the modified data groupings "Salt Lake City, 18-27" and "San Francisco, 32-41" show that the system 100 modified the age ranges of the data groupings to include some ages not included in the selected data in order to comply with relevant anonymity thresholds, also as discussed above with regard to FIG. 3.

It will be appreciated that the data groupings shown in FIG. 7A merely show an example embodiment, and that the filtered data groupings area 710 may conform to any of a variety of designs for presenting filtered data groupings. Further, it will be appreciated that the example data groupings shown in FIG. 7A are merely examples of data groupings, and that the system 100 may determine data groupings in any of a variety of ways, as discussed in greater detail with regard to FIG. 3.

The modified filtered data groupings area 710 may also include a selected filtered data grouping 712. In response to detecting selection of a filtered data grouping, the system 100 may designate it the selected filtered data grouping 710. For example, in FIG. 7A, the selected filtered data grouping 710 is shown with an underline to indicate its selection. However, the selected filtered data grouping 710 may conform to any of a variety of designs that show that it has been selected. For example, the selected filtered data grouping 710 may be shown bolded, in a different color or shading, circled, or according to a variety of designs.

Further, in response to the selection of the selected filtered data grouping 710, the data filtering interface 100 may include one or more text responses related to the selected filtered data grouping in the text response display area 714. The text response display area 714 may include a heading indicating the selected filtered data grouping 710, and one or more text responses related to the selected filtered data grouping 710. The text response display area may include one or more genericized text responses. As discussed in greater detail with regard to FIG. 4, the system 100 may genericize text responses via a variety of methods. The example responses in FIG. 7A show only a few applications of these genericization methods discussed above.

Figure 7B:
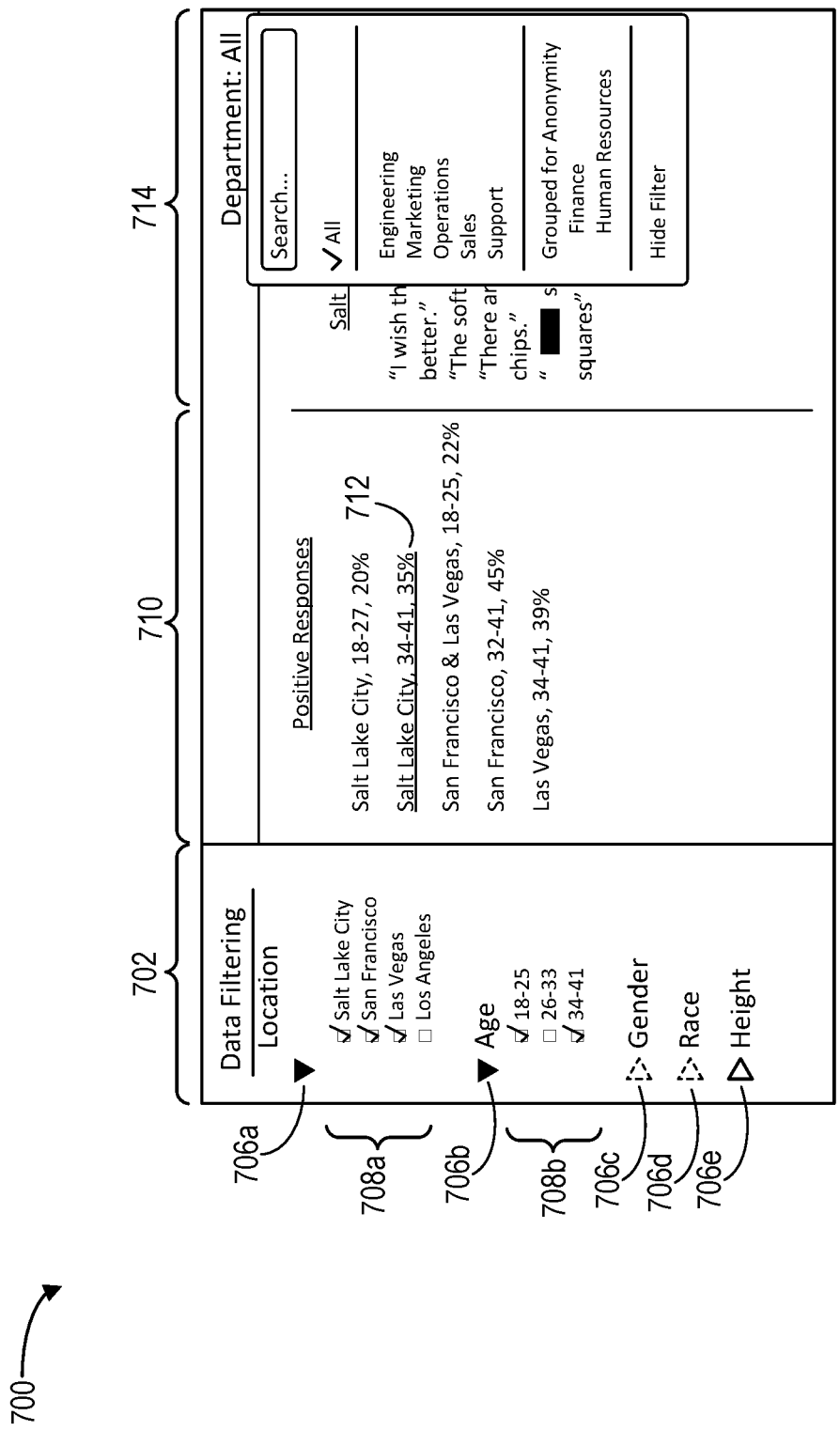

FIG. 7B illustrates an example graphical user interface that the system can provide to a client device of a user. In particular, the graphical user interface illustrated in FIG. 7B provides an example of how the anonymity protection system can create data request options by grouping options together before ever receiving a data request from a client device associated with a user. For example, the anonymity protection system can create a set of data filter options or other data breakout options that ensure the anonymity of respondents even when combing all of the possible combinations of available data request options. The anonymity protection system generates the data request options based on evaluating the size of the dataset, the number of categories within the dataset, and the anonymity thresholds associated with each of the categories and identifies any data request options or combination of data request options that would result in a breach of an anonymity threshold for both filtered-in data and filtered-out data. Based on the evaluation, the anonymity protection system generates data request options that satisfy the anonymity thresholds associated with the dataset.

For example, FIG. 7B illustrates a data request or reporting graphical user interface that allows a user to filter survey response data by department. Based on a receiving an indication of a user selection of the department filter option, the system can provide a dropdown of selectable filter options associated with different departments. As further illustrated in FIG. 7B, the anonymity protection system determines that to meet one or more anonymity thresholds the Finance department and the Human Resources department must be grouped together as indicated in the figure. In particular, the system provides the options to allow a user to filter by individual departments of Engineering, Marketing, Operations, Sales, and Support because doing so would not violate anonymity thresholds. However, the system determines that individually filtering the Finance department or the Human Resources department would indeed not satisfy one or more anonymity thresholds. Furthermore, the system determines that if the Finance department and the Human Resources department are treated as a single group, then anonymity thresholds would be met. Accordingly, the system can predetermine an anonymity grouping of Finance and Human Resources upfront and only provide data filtering options that comply with anonymity thresholds.

Figure 8:
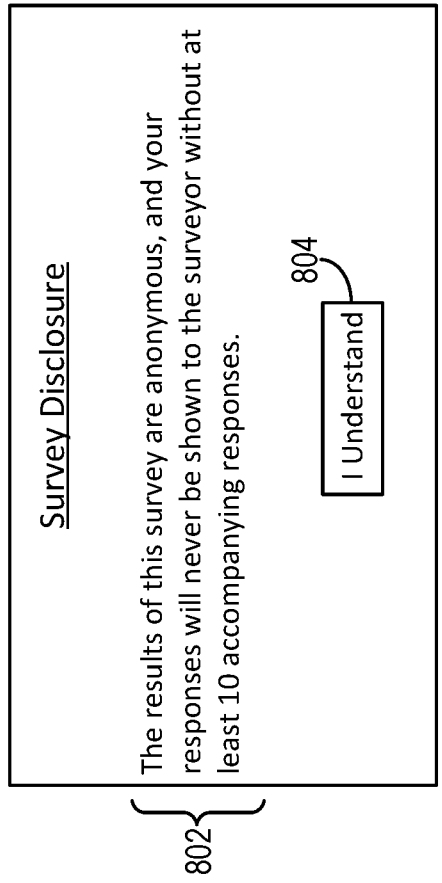
FIG. 8 illustrates an example graphical user interface for showing anonymity protections in an electronic survey in accordance with one or more embodiments.

FIG. 8 shows an example graphical user interface for informing the respondent 116 of anonymity settings for an electronic survey. More specifically, FIG. 8 illustrates a survey disclosure interface 800 that allows a respondent 116 to consent to anonymity settings. As shown in FIG. 8, the survey disclosure interface 800 may include a survey disclosure 802. The survey disclosure 802 displays information relating to the anonymity settings for a survey that the electronic survey system 122 may provide to the respondent device 112 following the survey disclosure interface 800. The survey disclosure may include information about any anonymity standards, practices, or settings that the related survey may or may not comply with. It will be appreciated that though FIG. 8 shows a specific survey disclosure that may apply to one example survey, the survey disclosure 802 may include any of a variety of information related to the anonymity of a related survey.

Further, the survey disclosure interface 800 may include a consent button 804. In one or more embodiments, the system 100 may present a consent button 804, and may present the related survey only after a respondent 116 has interacted with the consent button 804. It will be appreciated that though FIG. 8 shows the consent button 804 as a rectangle containing the words "I Understand," the consent button 804 could conform to any of a variety of designs that convey to a user that user interaction of the button indicates an understanding of the survey disclosure.

Figure 9:
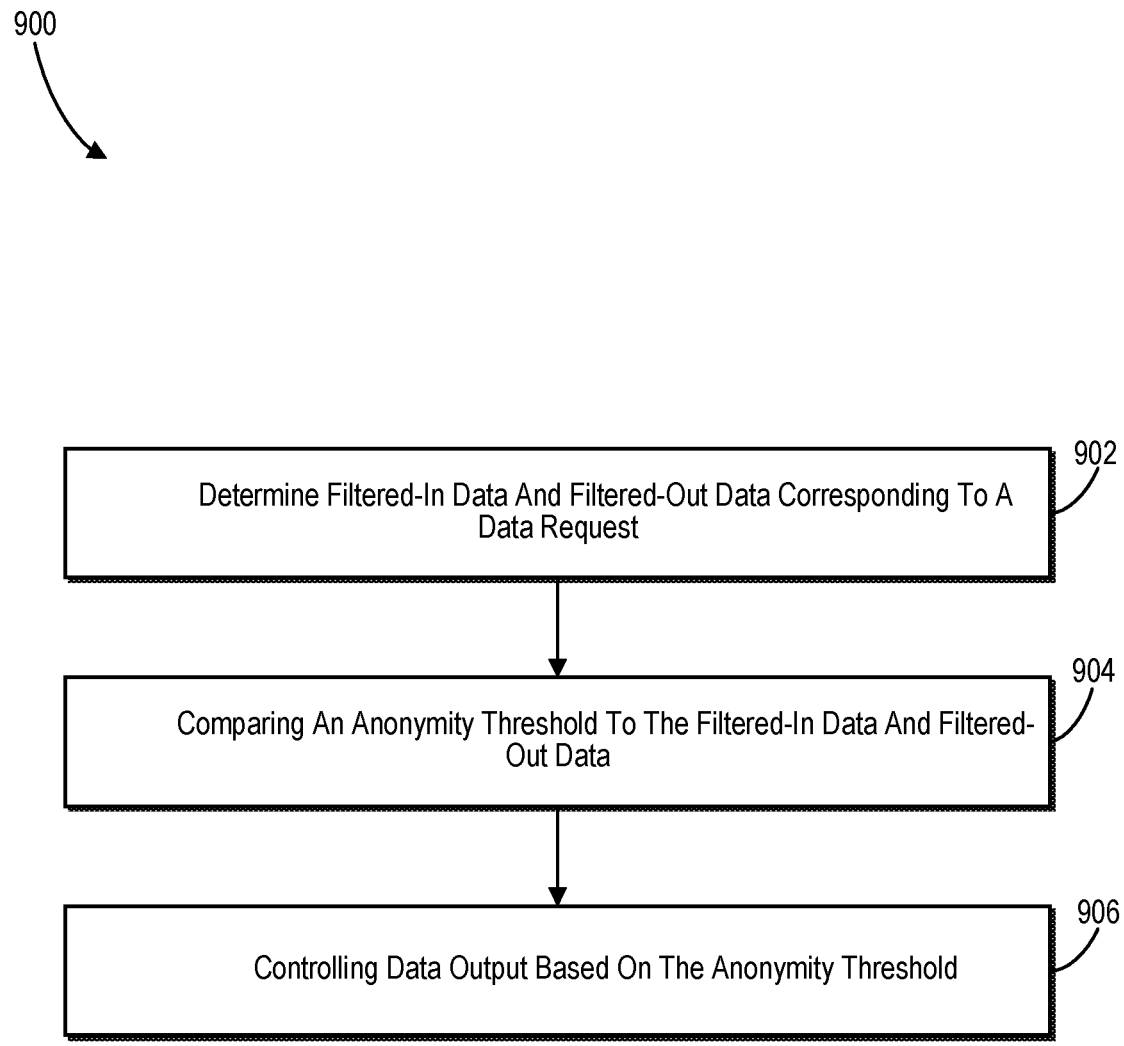
FIG. 9 illustrates a flowchart of a series of acts for providing data anonymity protection in accordance with one or more embodiments.

FIG. 9, the corresponding text, and the examples provide a number of different methods, systems, devices, and non-transitory computer-readable media of the system 100. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As illustrated in FIG. 9, the method 900 may include an act 902 of determining filtered-in data and filtered-out data corresponding to a data request. For example, act 902 can include determining a first number of users associated with filtered-in data based on a data filter request to be applied to a dataset and a second number of users associated with filtered-out data based on the data filter request to be applied to the dataset. Additionally, in one or more embodiments, the method 900 may include identifying a number of users associated with a cross-filter comparison.

The system 100 may also perform the act 904 of comparing an anonymity threshold to the filtered-in data and filtered-out data For example, the act 904 can include comparing an anonymity threshold with the first number of users associated with the filtered-in data and the second number of users associated with the filtered-out data.

In one or more embodiments, as shown in FIG. 9, the method 900 may also include an act 906 of controlling data output based on the anonymity threshold. For example, the act 906 can include controlling, based on the comparison, data output from the dataset in accordance with the anonymity threshold. For example, controlling the data output from the dataset may include modifying a graphical user interface by removing data filter options. Additionally, controlling the data output from the dataset can include generating a modified data output that comprises a larger dataset compared to an actual dataset associated with the data filter request, and providing the modified data output to a client device. Furthermore, controlling the data output from the dataset can include generating, based on the anonymity threshold, modified data groupings that are different from data groupings associated with the data filter request, and providing the modified data groupings to a client device.

In addition, method 900 can include receiving, from a client device, an indication of a selected data filter option, and determining, based on the selected data filter option, one or more potential data filter options that, if selected in combination with the selected data filter option, would not satisfy the anonymity threshold based on the first number of users associated with the filtered-in data or the second number of users associated with the filtered-out options.

Moreover, controlling the data output from the dataset in accordance with the anonymity threshold comprises deactivating the one or more potential data filter options within a graphical user interface of the client device.

Figure 10:
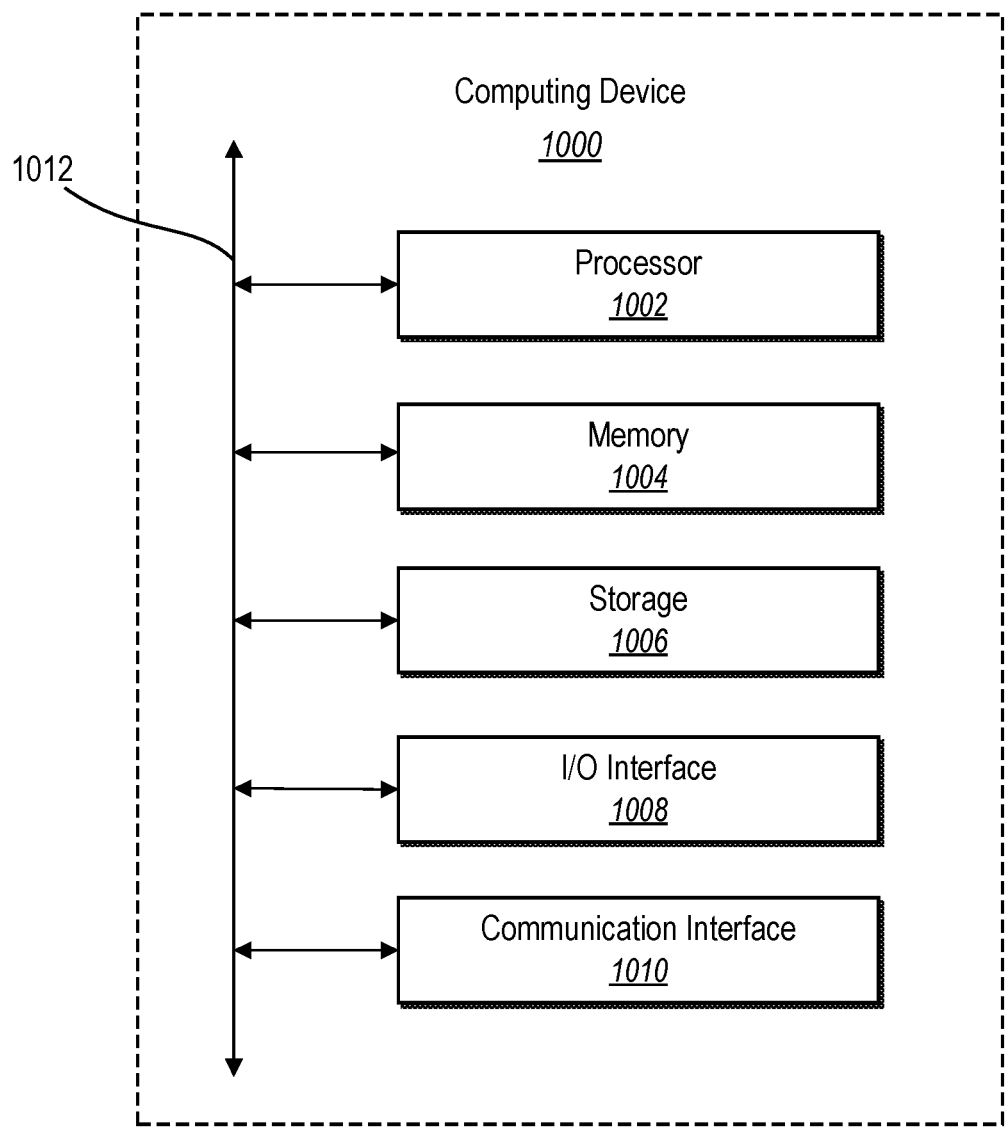
FIG. 10 illustrates a block diagram of an example computing device for implementing one or more embodiments of the present disclosure.

FIG. 10 illustrates a block diagram of exemplary computing device 1000 that can be configured to perform one or more of the processes described above. One will appreciate that one or more computing devices such as the computing device 1000 can implement the various devices of the environment of FIG. 1. As shown by FIG. 10, the computing device 1000 can comprise a processor 1002, a memory 1004, a storage device 1006, an I/O interface 1008, and a communication interface 1010, which can be communicatively coupled by way of a communication infrastructure 1012. While an exemplary computing device 1000 is shown in FIG. 10, the components illustrated in FIG. 10 are not intended to be limiting. Additional or alternative components can be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 can retrieve (or fetch) the instructions from an internal register, an internal cache, the memory 1004, or the storage device 1006 and decode and execute them. In one or more embodiments, the processor 1002 can include one or more internal caches for data, instructions, or addresses. As an example and not by way of limitation, the processor 1002 can include one or more instruction caches, one or more data caches, and one or more translation lookaside buffers (TLBs). Instructions in the instruction caches can be copies of instructions in the memory 1004 or the storage 1006.

The memory 1004 can be used for storing data, metadata, and programs for execution by the processor(s). The memory 1004 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 can be internal or distributed memory.

The storage device 1006 includes storage for storing data or instructions. As an example and not by way of limitation, storage device 1006 can comprise a non-transitory storage medium described above. The storage device 1006 can include a hard disk drive (HDD), a floppy disk drive, flash memory, an optical disc, a magneto-optical disc, magnetic tape, or a Universal Serial Bus (USB) drive or a combination of two or more of these. The storage device 1006 can include removable or non-removable (or fixed) media, where appropriate. The storage device 1006 can be internal or external to the computing device 1000. In one or more embodiments, the storage device 1006 is non-volatile, solid-state memory. In other embodiments, the storage device 1006 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 can include a mouse, a keypad or a keyboard, a touch screen, a camera, an optical scanner, network interface, modem, other known I/O devices or a combination of such I/O interfaces. The I/O interface 1008 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data can be representative of one or more graphical user interfaces and/or any other graphical content as can serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1010 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 1010 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 can include hardware, software, or both that couples components of the computing device 1000 to each other. As an example and not by way of limitation, the communication infrastructure 1012 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA)

bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
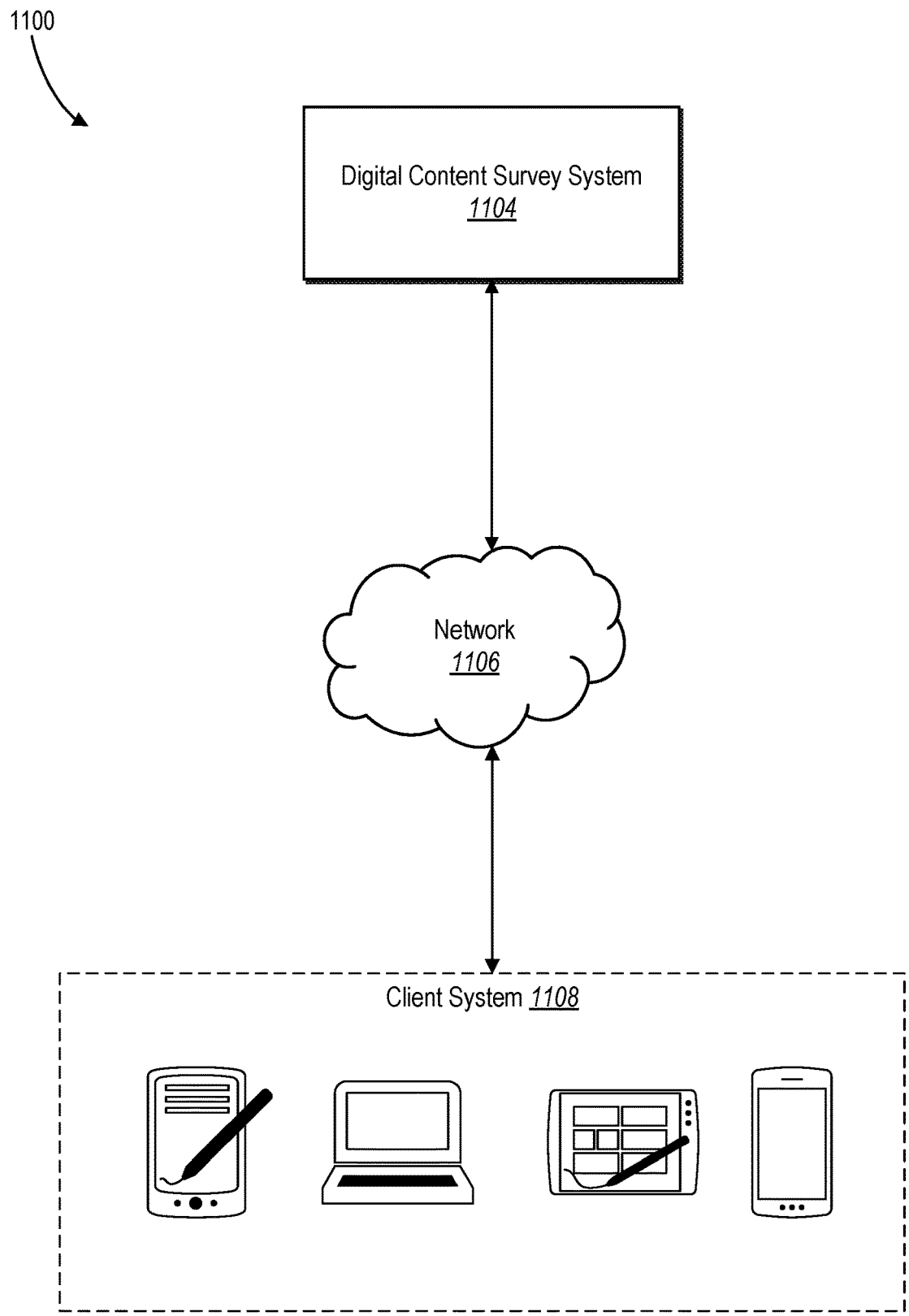
FIG. 11 illustrates a network environment of a digital survey system in accordance with one or more embodiments.

FIG. 11 illustrates an example network environment 1100 for a survey system 122. Network environment 1100 includes a client device 1106, and a server device 1102 connected to each other by a network 1104. Although FIG. 11 illustrates a particular arrangement of client device 1106, server device 1102, and network 1104, this disclosure contemplates any suitable arrangement of client device 1106, server device 1102, and network 1104. As an example and not by way of limitation, two or more of client device 1106, and server device 1102 can be connected to each other directly, bypassing network 1104. As another example, two or more of client device 1106 and server device 1102 can be physically or logically co-located with each other in whole, or in part. Moreover, although FIG. 11 illustrates a particular number of client devices 1106, server devices 1102, and networks 1104, this disclosure contemplates any suitable number of client devices 1106, server devices 1102, and networks 1104. As an example and not by way of limitation, network environment 1100 can include multiple client devices 1106, server devices 1102, and networks 1104.

This disclosure contemplates any suitable network 1104. As an example and not by way of limitation, one or more portions of network 1104 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 can include one or more networks 1104.

Links can connect client device 1106, and server device 1102 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links can differ in one or more respects from one or more second links.

In particular embodiments, client device 1106 can be an electronic device including hardware, software, or embedded logic components or a combination of two or more such components and capable of carrying out the appropriate functionalities implemented or supported by client device 1106. As an example and not by way of limitation, a client device 1106 can include any of the computing devices discussed above in relation to FIG. 11. A client device 1106 can enable a network user at client device 1106 to access network 1104. A client device 1106 can enable its user to communicate with other users at other client devices or systems.

In particular embodiments, client device 1106 can include a web browser, such as MICROSOFT INTERNET EXPLORER, GOOGLE CHROME, or MOZILLA FIREFOX, and can have one or more add-ons, plug-ins, or other extensions, such as TOOLBAR or YAHOO TOOLBAR. A user at client device 1106 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client device 1106 one or more Hyper Text Markup Language (HTML) files responsive to the HTTP request. Client device 1106 can render a webpage based on the HTML files from the server for presentation to the user. This disclosure contemplates any suitable webpage files. As an example and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, server device 1102 can include a variety of servers, sub-systems, programs, modules, logs, and data stores. In particular embodiments, server device 1102 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1102 can also include suitable components such as network interfaces, security mechanisms, load balancers, failover servers, management-and-network-operations consoles, other suitable components, or any suitable combination thereof.

In particular embodiments, server device 1102 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, in response to a data filter request indicating a data filter applied to a dataset, a first set of users associated with filtered-in data that pass the data filter and a second set of users associated with filtered-out data that do not pass the data filter;
   determining an anonymity threshold associated with the dataset and indicating a minimum number of users required to be in the first set of users that pass the data filter and a minimum number of users required to be in the second set of users that do not pass the data filter;
   comparing the anonymity threshold with a first number of users in the first set of users that pass the data filter and comparing the anonymity threshold with a second number of users in the second set of users that do not pass the data filter;
   in response to determining that at least one of the first number of users or the second number of users do not satisfy the anonymity threshold, combining one or more sub-groups of the dataset to generate:
   a third set of users associated with the filtered-in data with a third number of users that pass the data filter and satisfy the anonymity threshold; and
   a fourth set of users associated with filtered-out data with a fourth number of users that do not pass the data filter and satisfy the anonymity threshold; and
   generating a modified data output comprising the third set of users and the fourth set of users to provide in response to the data filter request.

2. The computer-implemented method of claim 1, wherein generating the modified data output comprises modifying a graphical user interface by removing data filter options.

3. The computer-implemented method of claim 1, further comprising:
   receiving, from a client device, an indication of a selected data filter option; and
   determining, based on the selected data filter option, one or more potential data filter options that, if selected in combination with the selected data filter option, would not satisfy the anonymity threshold based on the first number of users in the first set of users that pass the data filter or the second number of users in the second set of users that do not pass the data filter.

4. The computer-implemented method of claim 3, wherein generating the modified data output comprises deactivating the one or more potential data filter options within a graphical user interface of the client device based on comparing the anonymity threshold with the first number of users and the second number of users.

5. The computer-implemented method of claim 1, wherein generating the modified data output comprises:
   generating a larger dataset compared to an actual dataset associated with the data filter request; and
   further comprising providing the modified data output to a client device.

6. The computer-implemented method of claim 1, wherein generating the modified data output comprises:
   generating a smaller dataset compared to an actual dataset associated with the data filter request; and
   further comprising providing the modified data output to a client device.

7. The computer-implemented method of claim 1, wherein generating the modified data output comprises:
   generating, based on the anonymity threshold, modified data groupings that are different from data groupings associated with the data filter request; and
   further comprising providing the modified data groupings to a client device.

8. The computer-implemented method of claim 1, wherein determining the anonymity threshold comprises identifying one or more anonymity thresholds associated with a user account corresponding to the data filter request.

9. A non-transitory computer-readable medium storing instructions that, when executed by at least one processor, cause a computer device to:
   determine, in response to a data filter request indicating a data filter applied to a dataset, a first set of users associated with filtered-in data that pass the data filter and a second set of users associated with filtered-out data that do not pass the data filter;
   determine an anonymity threshold associated with the dataset and indicating a minimum number of users required to be in the first set of users that pass the data filter and a minimum number of users required to be in the second set of users that do not pass the data filter;
   compare the anonymity threshold with a first number of users in the first set of users that pass the data filter and comparing the anonymity threshold with a second number of users in the second set of users that do not pass the data filter;
   in response to determining that at least one of the first number of users or the second number of users do not satisfy the anonymity threshold, combining one or more sub-groups of the dataset to generate:
   a third set of users associated with the filtered-in data with a third number of users that pass the data filter and satisfy the anonymity threshold; and
   a fourth set of users associated with filtered-out data with a fourth number of users that do not pass the data filter and satisfy the anonymity threshold; and
   generate a modified data output comprising the third set of users and the fourth set of users to provide in response to the data filter request.

10. The non-transitory computer-readable medium of claim 9, further comprising instructions that, when executed by the at least one processor, cause the computer device to generate the modified data output from the dataset by modifying a graphical user interface by removing data filter options.

11. The non-transitory computer-readable medium of claim 9, further comprising instructions that, when executed by the at least one processor, cause the computer device to:
   receive, from a client device, an indication of a selected data filter option; and
   determine, based on the selected data filter option, one or more potential data filter options that, if selected in combination with the selected data filter option, would not satisfy the anonymity threshold based on the first number of users in the first set of users that pass the data filter or the second number of users in the second set of users that do not pass the data filter.

12. The non-transitory computer-readable medium of claim 11, further comprising instructions that, when executed by the at least one processor, cause the computer device to generate the modified data output by deactivating the one or more potential data filter options within a graphical user interface of the client device based on comparing the anonymity threshold with the first number of users and the second number of users.

13. A system comprising:
at least one processor; and
at least one non-transitory computer-readable storage medium storing instructions that, when executed by the at least one processor, cause the system to:
determine, in response to a data filter request indicating a data filter applied to a dataset, a first set of users associated with filtered-in data that pass the data filter and a second set of users associated with filtered-out data that do not pass the data filter;
determine an anonymity threshold associated with the dataset and indicating a minimum number of users required to be in the first set of users that pass the data filter and a minimum number of users required to be in the second set of users that do not pass the data filter;
compare the anonymity threshold with a first number of users in the first set of users that pass the data filter and comparing the anonymity threshold with a second number of users in the second set of users that do not pass the data filter;
in response to determining that at least one of the first number of users or the second number of users do not satisfy the anonymity threshold, combining one or more sub-groups of the dataset to generate:
a third set of users associated with the filtered-in data with a third number of users that pass the data filter and satisfy the anonymity threshold; and
a fourth set of users associated with filtered-out data with a fourth number of users that do not pass the data filter and satisfy the anonymity threshold; and
generate a modified data output comprising the third set of users and the fourth set of users to provide in response to the data filter request.

14. The system of claim 13, further comprising instructions that, when executed by the at least one processor, cause the system to generate the modified data output from the dataset by modifying a graphical user interface by removing data filter options.

15. The system of claim 13, further comprising instructions that, when executed by the at least one processor, cause the system to:
receive, from a client device, an indication of a selected data filter option; and
determine, based on the selected data filter option, one or more potential data filter options that, if selected in combination with the selected data filter option, would not satisfy the anonymity threshold based on the first number of users in the first set of users that pass the data filter or the second number of users in the second set of users that do not pass the data filter.

16. The system of claim 15, further comprising instructions that, when executed by the at least one processor, cause the system to generate the modified data output by deactivating the one or more potential data filter options within a graphical user interface of the client device based on comparing the anonymity threshold with the first number of users and the second number of users.

17. The system of claim 13, further comprising instructions that, when executed by the at least one processor, cause the system to generate the modified data output by:
generating a larger dataset compared to an actual dataset associated with the data filter request; and
further comprising providing the modified data output to a client device.

18. The system of claim 13, further comprising instructions that, when executed by the at least one processor, cause the system to generate the modified data output by:
generating a smaller dataset compared to an actual dataset associated with the data filter request; and
further comprising providing the modified data output to a client device.

19. The system of claim 13, further comprising instructions that, when executed by the at least one processor, cause the system to generate the modified data output by:
generating, based on the anonymity threshold, modified data groupings that are different from data groupings associated with the data filter request; and
further comprising providing the modified data groupings to a client device.

20. The system of claim 13, further comprising instructions that, when executed by the at least one processor, cause the system to determine the anonymity threshold by identifying one or more anonymity thresholds associated with a user account corresponding to the data filter request.

* * * * *